US010054964B2

(12) United States Patent
Filson et al.

(10) Patent No.: US 10,054,964 B2
(45) Date of Patent: Aug. 21, 2018

(54) BUILDING CONTROL UNIT METHOD AND CONTROLS

(75) Inventors: John B. Filson, Mountain View, CA (US); Eric B. Daniels, East Palo Alto, CA (US); Anthony M. Fadell, Portola Valley, CA (US); Matthew Lee Rogers, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 1772 days.

(21) Appl. No.: 13/466,026

(22) Filed: May 7, 2012

(65) Prior Publication Data

US 2013/0292481 A1  Nov. 7, 2013

(51) Int. Cl.
*G06F 3/048* (2013.01)
*G05D 23/19* (2006.01)
*F24F 13/20* (2006.01)

(52) U.S. Cl.
CPC .... *G05D 23/1902* (2013.01); *F24F 2013/207* (2013.01); *H01H 2300/03* (2013.01); *Y02B 90/224* (2013.01); *Y04S 20/14* (2013.01)

(58) Field of Classification Search
CPC .......... H01H 37/28; H01H 9/02; H01H 13/64; H01H 11/0031; H01H 37/52; H01H 37/521; H01H 73/28; H01H 73/30; H01H 73/306; H01H 73/54; H01H 73/56; H01H 1/2041; H01H 1/205; H01H 2071/565;
(Continued)

(56) References Cited

U.S. PATENT DOCUMENTS 4,129,847 A * 12/1978 Teichert ................. H01H 37/62
337/301
4,316,577 A    2/1982 Adams et al.
(Continued)

FOREIGN PATENT DOCUMENTS

DE    19609390    9/1997
EP    434926    7/1991
(Continued)

OTHER PUBLICATIONS

Energy Joule, Ambient Devices, retrieved from the Internet: <URL: http://web.archive.org/web/20110723210421/http://www.ambientdevices.com/products/energyjoule.html> [retrieved on Aug. 1, 2012], Jul. 23, 2011, 2 pages.
(Continued)

*Primary Examiner* — William Bashore
*Assistant Examiner* — Rayeez Chowdhury
(74) *Attorney, Agent, or Firm* — Kilpatrick Townsend & Stockton LLP

(57) ABSTRACT

Embodiments of the invention provide thermostat controls having improved tactile feedback. According to one embodiment, a thermostat includes a bottom member, a switch, a top member, and a motion guiding member or assembly that operationally couples the top member with the bottom member so that the top member is inwardly pressable by a user relative to the bottom member to allow the thermostat to receive input from the user by contacting the switch with a component of the top member or the bottom member. The motion guiding member or assembly contacts the top mem- (Continued)

ber near its outer periphery to control the inward motion of the top member relative to the bottom member to provide the improved tactile feedback.

12 Claims, 21 Drawing Sheets

(58) Field of Classification Search
CPC .. H01H 21/285; H01H 50/643; H01H 50/644; H01H 67/06; H01H 67/16; H01H 73/045; G06F 3/0482; G06F 1/206; B60H 1/00642; F24F 11/00; F24F 11/001; F24F 11/0015; F24F 11/0017; F24F 11/0034; F24F 11/006; F24F 11/0076; F24F 11/0086; F24F 11/085; F24F 2011/0067; F24F 3/0527; F24F 11/0012; F24F 11/053; F24F 2011/0013; F24F 2011/0045; G05B 2219/2614; G05B 2219/2638; G05B 2219/2648; G05B 2219/21042; G05B 2219/23435; G05B 19/106; G05B 19/108; G05B 19/409; G05B 2219/23257; G05B 2219/23258; G05B 2219/25067; G05B 2219/32128; G05B 23/0216; G05B 23/0272; G05B 19/0426; G05B 2219/23276; G05B 2219/23286; G05B 2219/31466; G05B 2219/31467; G05B 2219/31468; G05B 2219/31469; G05B 2219/31471; G05B 2219/31472; G05B 2219/31473; G05B 2219/31474; G05B 2219/31475; G05B 2219/31476; G05B 2219/31477; G05B 2219/31478; G05B 2219/31479; G05B 2219/31481; G05B 2219/31482; G05B 2219/32146; G05B 2219/32149; G05B 2219/34038; Y02B 70/3275; Y04S 20/244; G05D 23/193; G05D 23/1932; G05D 23/1934; G05D 23/1928; G05D 23/1931; G05D 23/1935; G05D 23/1917; H05K 7/20209; Y10S 715/965

See application file for complete search history.

(56) References Cited

U.S. PATENT DOCUMENTS

| | | | |
|---|---|---|---|
| 4,460,125 A | 7/1984 | Barker et al. | |
| 4,751,961 A | 6/1988 | Levine et al. | |
| 4,768,706 A | 9/1988 | Parfitt | |
| 5,005,365 A | 4/1991 | Lynch | |
| 5,224,649 A | 7/1993 | Brown et al. | |
| 5,294,047 A | 3/1994 | Schwer et al. | |
| 5,303,612 A | 4/1994 | Odom et al. | |
| 5,395,042 A | 3/1995 | Riley et al. | |
| 5,415,346 A | 5/1995 | Bishop | |
| 5,482,209 A | 1/1996 | Cochran et al. | |
| 5,485,954 A | 1/1996 | Guy et al. | |
| 5,555,927 A | 9/1996 | Shah | |
| 5,603,451 A | 2/1997 | Helander et al. | |
| 5,621,196 A * | 4/1997 | Nishijima | H01H 25/041 200/4 |
| 5,627,531 A | 5/1997 | Posso et al. | |
| 5,673,850 A | 10/1997 | Uptegraph | |
| 5,808,602 A | 9/1998 | Sellers | |
| 5,931,378 A | 8/1999 | Schramm | |
| 6,032,867 A | 3/2000 | Dushane et al. | |
| 6,164,374 A | 12/2000 | Rhodes et al. | |
| 6,206,295 B1 | 3/2001 | LaCoste | |
| 6,211,921 B1 | 4/2001 | Cherian et al. | |
| 6,213,404 B1 | 4/2001 | Dushane et al. | |
| 6,286,764 B1 | 9/2001 | Garvey et al. | |
| 6,298,285 B1 | 10/2001 | Addink et al. | |
| 6,453,687 B2 | 9/2002 | Sharood et al. | |
| 6,502,758 B2 | 1/2003 | Cottrell | |
| D471,825 S | 3/2003 | Peabody | |
| 6,636,197 B1 | 10/2003 | Goldenberg et al. | |
| 6,644,557 B1 | 11/2003 | Jacobs | |
| 6,814,299 B1 | 11/2004 | Carey | |
| D503,631 S | 4/2005 | Peabody | |
| 6,951,306 B2 | 10/2005 | DeLuca | |
| 7,000,849 B2 | 2/2006 | Ashworth et al. | |
| 7,083,109 B2 | 8/2006 | Pouchak | |
| 7,105,754 B2 * | 9/2006 | Turner | G10H 3/182 200/14 |
| 7,108,194 B1 | 9/2006 | Hankins, II | |
| 7,114,554 B2 | 10/2006 | Bergman et al. | |
| 7,140,551 B2 | 11/2006 | De Pauw et al. | |
| 7,141,748 B2 | 11/2006 | Tanaka et al. | |
| 7,156,318 B1 | 1/2007 | Rosen | |
| 7,159,789 B2 | 1/2007 | Schwendinger et al. | |
| 7,159,790 B2 | 1/2007 | Schwendinger et al. | |
| 7,258,280 B2 | 8/2007 | Wolfson | |
| 7,264,175 B2 | 9/2007 | Schwendinger et al. | |
| 7,287,709 B2 | 10/2007 | Proffitt et al. | |
| 7,299,996 B2 | 11/2007 | Garrett et al. | |
| 7,333,880 B2 | 2/2008 | Brewster et al. | |
| D566,587 S | 4/2008 | Rosen | |
| 7,451,937 B2 | 11/2008 | Flood et al. | |
| 7,455,240 B2 | 11/2008 | Chapman, Jr. et al. | |
| 7,509,753 B2 | 3/2009 | Nicosia et al. | |
| 7,555,364 B2 | 6/2009 | Poth et al. | |
| 7,558,648 B2 | 7/2009 | Hoglund et al. | |
| 7,575,179 B2 | 8/2009 | Morrow et al. | |
| 7,584,899 B2 | 9/2009 | de Pauw et al. | |
| 7,600,694 B2 | 10/2009 | Helt et al. | |
| D603,277 S | 11/2009 | Clausen et al. | |
| 7,614,567 B2 | 11/2009 | Chapman, Jr. et al. | |
| 7,624,931 B2 | 12/2009 | Chapman, Jr. et al. | |
| 7,634,504 B2 | 12/2009 | Amundson | |
| 7,641,126 B2 | 1/2010 | Schultz et al. | |
| 7,693,582 B2 | 4/2010 | Bergman et al. | |
| D614,976 S | 5/2010 | Skafdrup et al. | |
| 7,726,581 B2 | 6/2010 | Naujok et al. | |
| 7,845,576 B2 | 12/2010 | Siddaramanna et al. | |
| 7,904,209 B2 | 3/2011 | Podgorny et al. | |
| 7,904,830 B2 | 3/2011 | Hoglund et al. | |
| D651,529 S | 1/2012 | Mongell et al. | |
| 8,195,313 B1 | 6/2012 | Fadell et al. | |
| 8,280,536 B1 | 10/2012 | Fadell et al. | |
| 8,442,695 B2 | 5/2013 | Imes et al. | |
| 2001/0046402 A1 * | 11/2001 | Hasunuma | H01H 3/125 400/491.2 |
| 2002/0005435 A1 | 1/2002 | Cottrell | |
| 2002/0072428 A1 * | 6/2002 | Lin | A63B 69/3632 473/221 |
| 2003/0042320 A1 | 3/2003 | Decker | |
| 2003/0112262 A1 | 6/2003 | Adatia et al. | |
| 2004/0034484 A1 | 2/2004 | Solomita, Jr. et al. | |
| 2004/0093968 A1 * | 5/2004 | Oster | G01D 11/16 74/10.2 |
| 2004/0256472 A1 | 12/2004 | DeLuca | |
| 2005/0090915 A1 | 4/2005 | Geiwitz | |
| 2005/0119793 A1 | 6/2005 | Amundson et al. | |
| 2005/0159847 A1 | 7/2005 | Shah et al. | |
| 2005/0204997 A1 | 9/2005 | Fournier | |
| 2005/0224322 A1 * | 10/2005 | Kikuya | H01H 9/181 200/11 R |
| 2005/0279840 A1 | 12/2005 | Schwendinger et al. | |
| 2005/0279841 A1 | 12/2005 | Schwendinger et al. | |
| 2006/0000919 A1 | 1/2006 | Schwendinger et al. | |
| 2006/0012584 A1 * | 1/2006 | Vassallo | G06F 3/016 345/184 |
| 2006/0206220 A1 | 9/2006 | Amundson | |
| 2006/0237435 A1 * | 10/2006 | Nguyen | F24H 9/20 219/491 |
| 2007/0001830 A1 | 1/2007 | Dagci et al. | |
| 2007/0045430 A1 | 3/2007 | Chapman et al. | |
| 2007/0045433 A1 | 3/2007 | Chapman et al. | |
| 2007/0045444 A1 | 3/2007 | Gray et al. | |
| 2007/0050732 A1 | 3/2007 | Chapman et al. | |

(56) References Cited

U.S. PATENT DOCUMENTS

| | | |
|---|---|---|
| 2007/0084941 A1 | 4/2007 | De Pauw et al. |
| 2007/0115902 A1 | 5/2007 | Shamoon et al. |
| 2007/0158442 A1 | 7/2007 | Chapman et al. |
| 2007/0158444 A1 | 7/2007 | Naujok et al. |
| 2007/0173978 A1 | 7/2007 | Fein et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2008/0054082 A1 | 3/2008 | Evans et al. |
| 2008/0062127 A1* | 3/2008 | Brodersen ............ G06F 3/0482 345/158 |
| 2008/0215240 A1 | 9/2008 | Howard et al. |
| 2008/0245480 A1 | 10/2008 | Knight et al. |
| 2008/0290183 A1 | 11/2008 | Laberge et al. |
| 2008/0309637 A1* | 12/2008 | Lim ..................... G06F 1/1624 345/173 |
| 2009/0001180 A1 | 1/2009 | Siddaramanna et al. |
| 2009/0008233 A1* | 1/2009 | Saomoto ................. G05G 5/05 200/6 A |
| 2009/0140056 A1 | 6/2009 | Leen |
| 2009/0140057 A1 | 6/2009 | Leen |
| 2009/0143916 A1 | 6/2009 | Boll et al. |
| 2009/0194395 A1* | 8/2009 | Yamada ................ G06F 3/0338 200/14 |
| 2009/0283603 A1 | 11/2009 | Peterson et al. |
| 2010/0084482 A1 | 4/2010 | Kennedy et al. |
| 2010/0155490 A1* | 6/2010 | Halbur .................. G06Q 20/10 235/487 |
| 2010/0198425 A1 | 8/2010 | Donovan |
| 2010/0273610 A1 | 10/2010 | Johnson |
| 2010/0318227 A1 | 12/2010 | Steinberg et al. |
| 2011/0015798 A1 | 1/2011 | Golden et al. |
| 2011/0015802 A1 | 1/2011 | Imes |
| 2011/0029488 A1 | 2/2011 | Fuerst et al. |
| 2011/0046756 A1 | 2/2011 | Park |
| 2011/0173786 A1* | 7/2011 | Moshfegh ................ B26D 1/10 29/2.15 |
| 2012/0130546 A1 | 5/2012 | Matas et al. |
| 2012/0203379 A1 | 8/2012 | Sloo et al. |

FOREIGN PATENT DOCUMENTS

| | | |
|---|---|---|
| EP | 720077 | 7/1996 |
| EP | 802471 | 10/1997 |
| EP | 1065079 | 1/2001 |
| EP | 1731984 | 12/2006 |
| EP | 2157492 | 2/2010 |
| GB | 2212317 | 5/1992 |
| JP | 59106311 | 6/1984 |
| JP | 2002087050 | 3/2002 |
| JP | 2003054290 | 2/2003 |
| NL | 1024986 | 6/2005 |
| WO | 0248851 | 6/2002 |
| WO | 2009073496 | 6/2009 |
| WO | 2011128416 | 10/2011 |

OTHER PUBLICATIONS

Honeywell CT2700, An Electronic Round Programmable Thermostat—User's Guide, Honeywell, Inc., 1997, 8 pages.

Honeywell CT8775A,C, The digital Round Non-Programmable Thermostats—Owner's Guide, Honeywell International Inc., 2003, 20 pages.

Honeywell T8700C, An Electronic Round Programmable Thermostat—Owner's Guide, Honeywell, Inc., 1997, 12 pages.

Honeywell T8775 The Digital Round Thermostat, Honeywell, 2003, 2 pages.

Honeywell T8775AC Digital Round Thermostat Manual No. 69-1679EF-1, www.honeywell.com/yourhome, Jun. 2004, pp. 1-16.

ICY 3815TT-001 Timer-Thermostat Package Box, ICY BV Product Bar Code No. 8717953007902, 2009, 2 pages.

Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.

The Clever Thermostat, ICY BV Web Page, http://www.icy.nl/en/consumer/products/clever-thermostat, ICY BV, 2012, 1 page.

The Clever Thermostat User Manual and Installation Guide, ICY BV ICY3815 Timer-Thermostat, 2009, pp. 1-36.

U.S. Appl. No. 60/512,886, Volkswagen Rotary Knob for Motor Vehicle—English Translation of German Application filed on Oct. 20, 2003.

Arens et al., Demand Response Electrical Appliance Manager—User Interface Design, Development and Testing, Poster, Demand Response Enabling Technology Development, University of California Berkeley, 2005, 1 page.

Arens et al., Demand Response Enabled Thermostat—Control Strategies and Interface, Demand Response Enabling Technology Development Poster, University of California Berkeley, 2004, 1 page.

Arens et al., Demand Response Enabling Technology Development, Phase I Report: Jun. 2003-Nov. 2005, University of California Berkeley, Apr. 4, 2006, pp. 1-108.

Arens et al., New Thermostat Demand Response Enabling Technology, Poster, University of California Berkeley, Jun. 10, 2004.

Auslander et al., UC Berkeley DR Research Energy Management Group, Power Point Presentation, DR ETD Workshop, State of California Energy Commission, Jun. 11, 2007, pp. 1-35.

Chen et al., Demand Response-Enabled Residential Thermostat Controls, Abstract, ACEEE Summer Study on Energy Efficiency in Buildings, Mechanical Engineering Dept. and Architecture Dept., University of California Berkeley, 2008, pp. 1-24 through 1-36.

Green, Thermo Heat Tech Cool, Popular Mechanics Electronic Thermostat Guide, Oct. 1985, pp. 155-158.

Meier et al., Thermostat Interface Usability: A Survey, Ernest Orlando Lawrence Berkeley National Laboratory, Environmental Energy Technologies Division, Berkeley California, Sep. 2010, pp. 1-73.

Peffer et al., A Tale of Two Houses: The Human Dimension of Demand Response Enabling Technology from a Case Study of Adaptive Wireless Thermostat, Abstract, ACEEE Summer Study on Energy Efficiency in Buildings, Architecture Dept. and Mechanical Engineering Dept., University of California Berkeley., 2008, pp. 7-242 through 7-253.

Peffer et al., Smart Comfort At Home: Design of a Residential Thermostat to Achieve Thermal Comfort, and Save Money and Peak Energy, University of California Berkeley, Mar. 2007, 1 page.

Salus, S-Series Digital Thermostat Instruction Manual-ST620 Model No. Instruction Manual, www.salus-tech.com, Version 005, Apr. 29, 2010, 24 pages.

Sanford, iPod (Click Wheel) (2004), www.apple-history.com, retrieved from the Internet: <URL: http://apple-history.com/ipod> [retrieved on Apr. 9, 2012], 2012, 2 pages.

Wright et al., DR ETD—Summary of New Thermostat, TempNode, & New Meter (UC Berkeley Project), Power Point Presentation, Public Interest Energy Research, University of California Berkeley, 2005, pp. 1-49.

\* cited by examiner

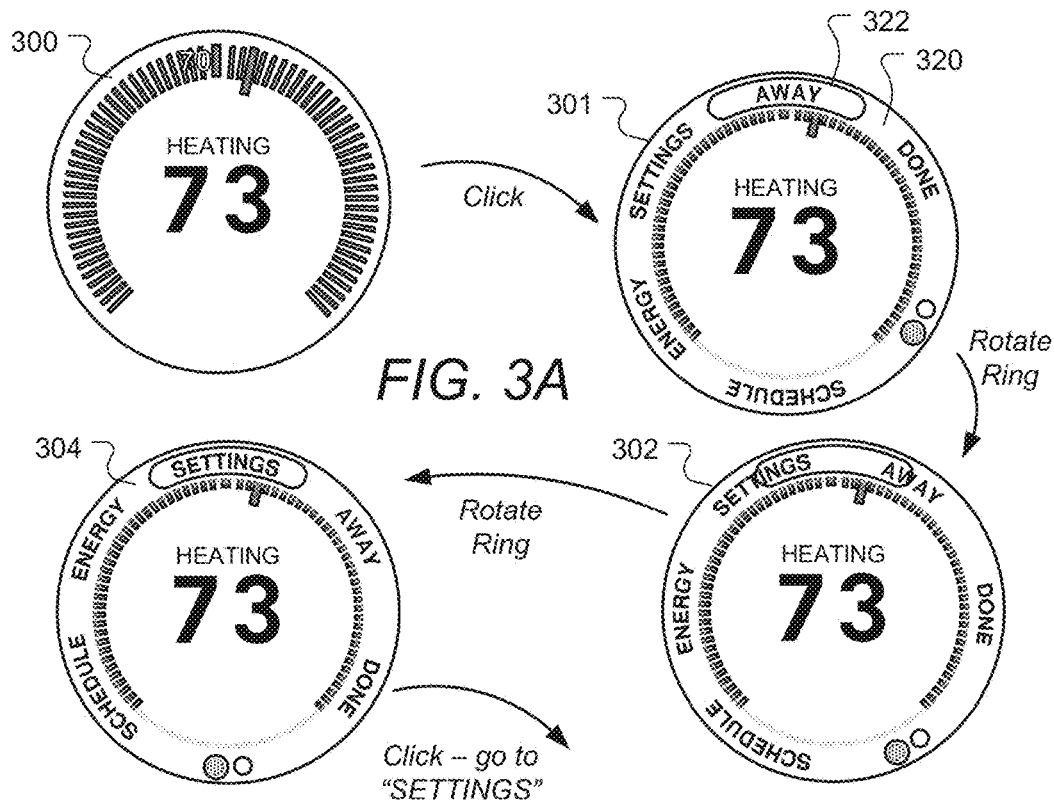
FIG. 3A
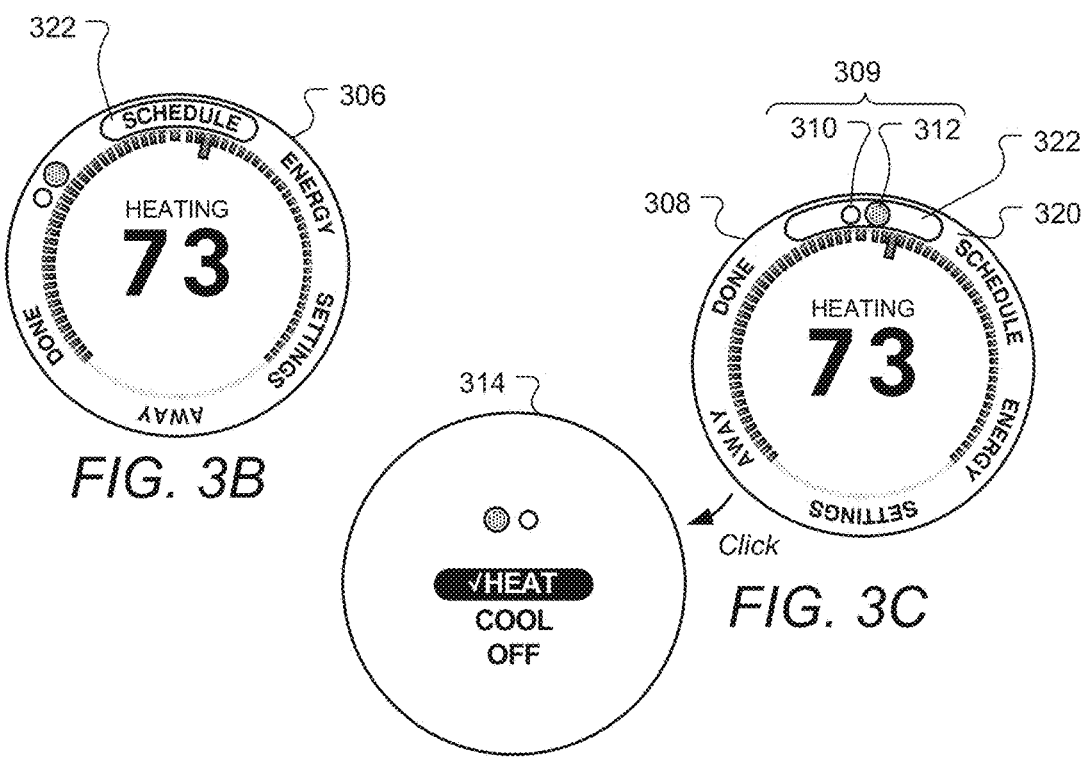
FIG. 3B
FIG. 3C

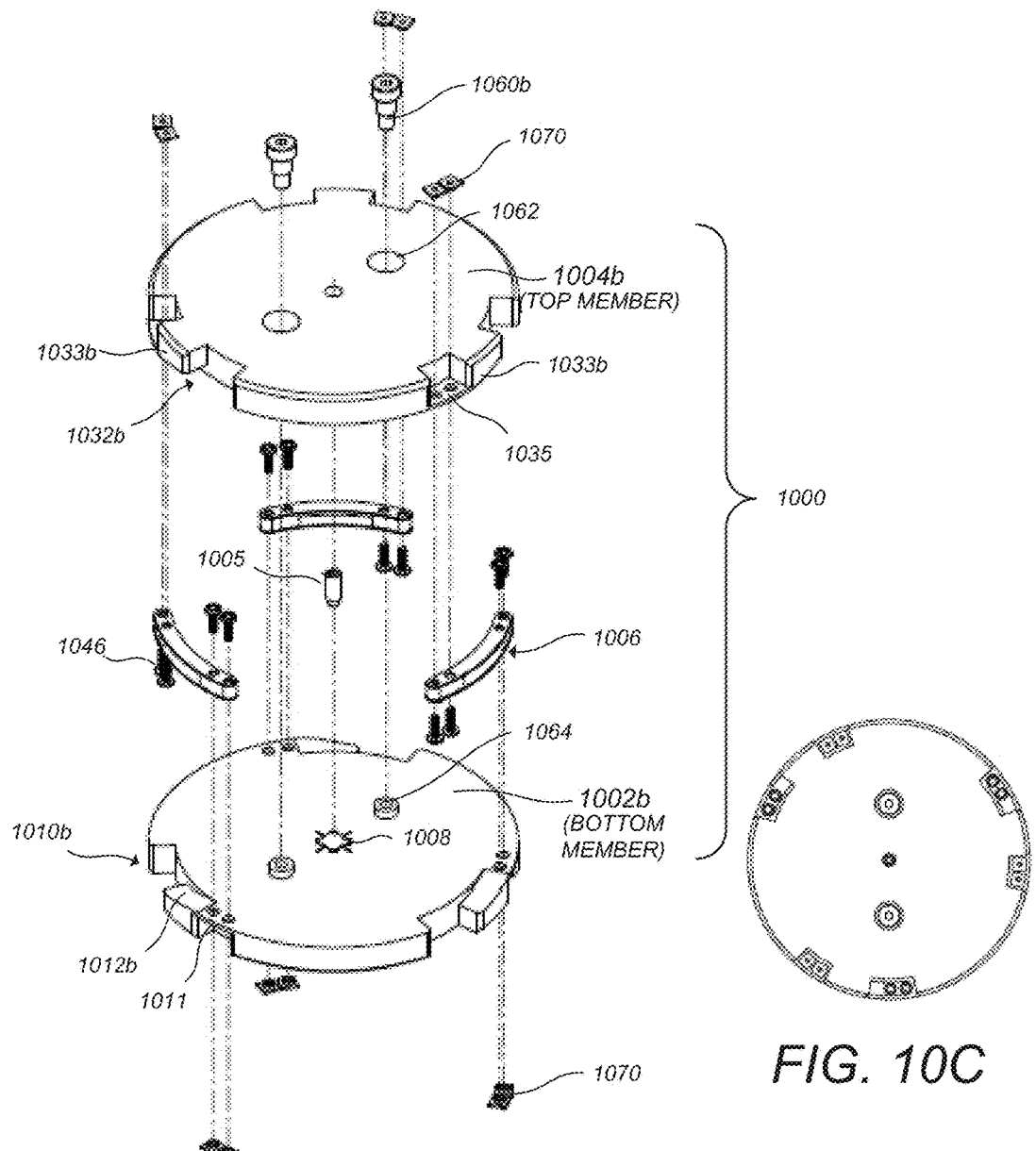
FIG. 10B
FIG. 10D
FIG. 10C

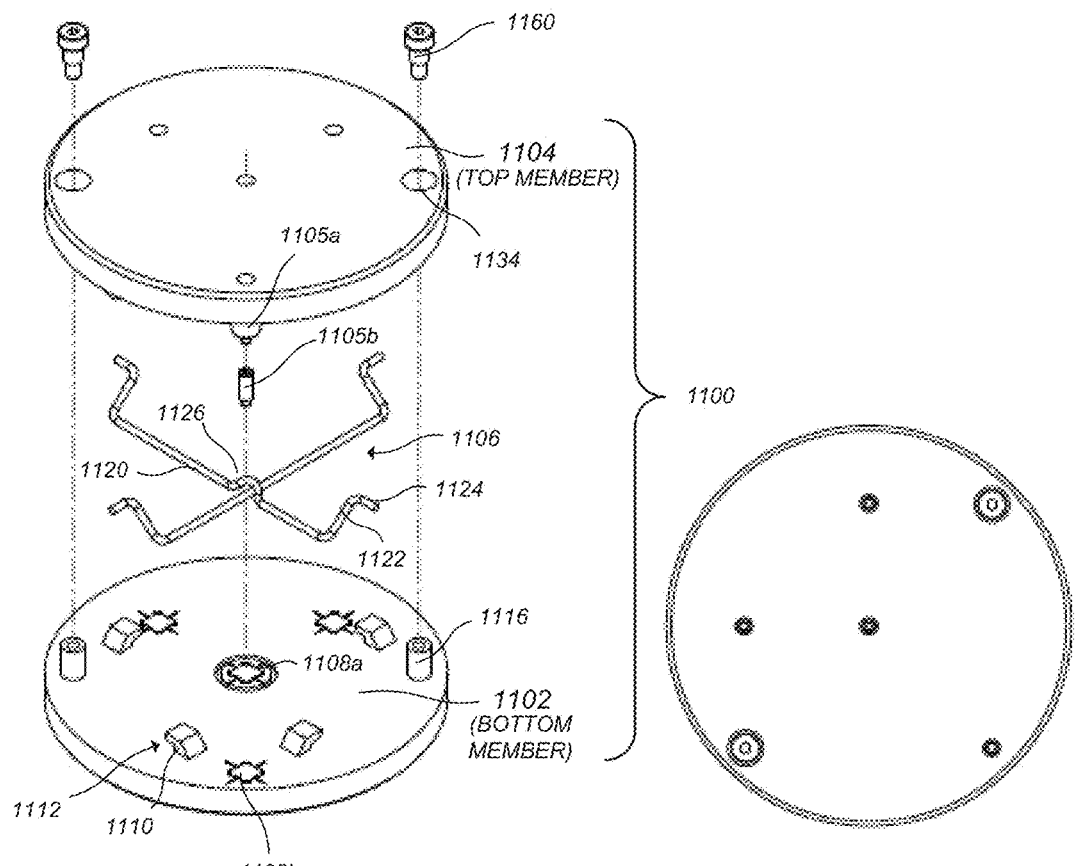
FIG. 11A
FIG. 11B
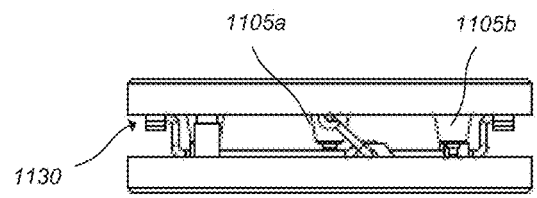
FIG. 11C

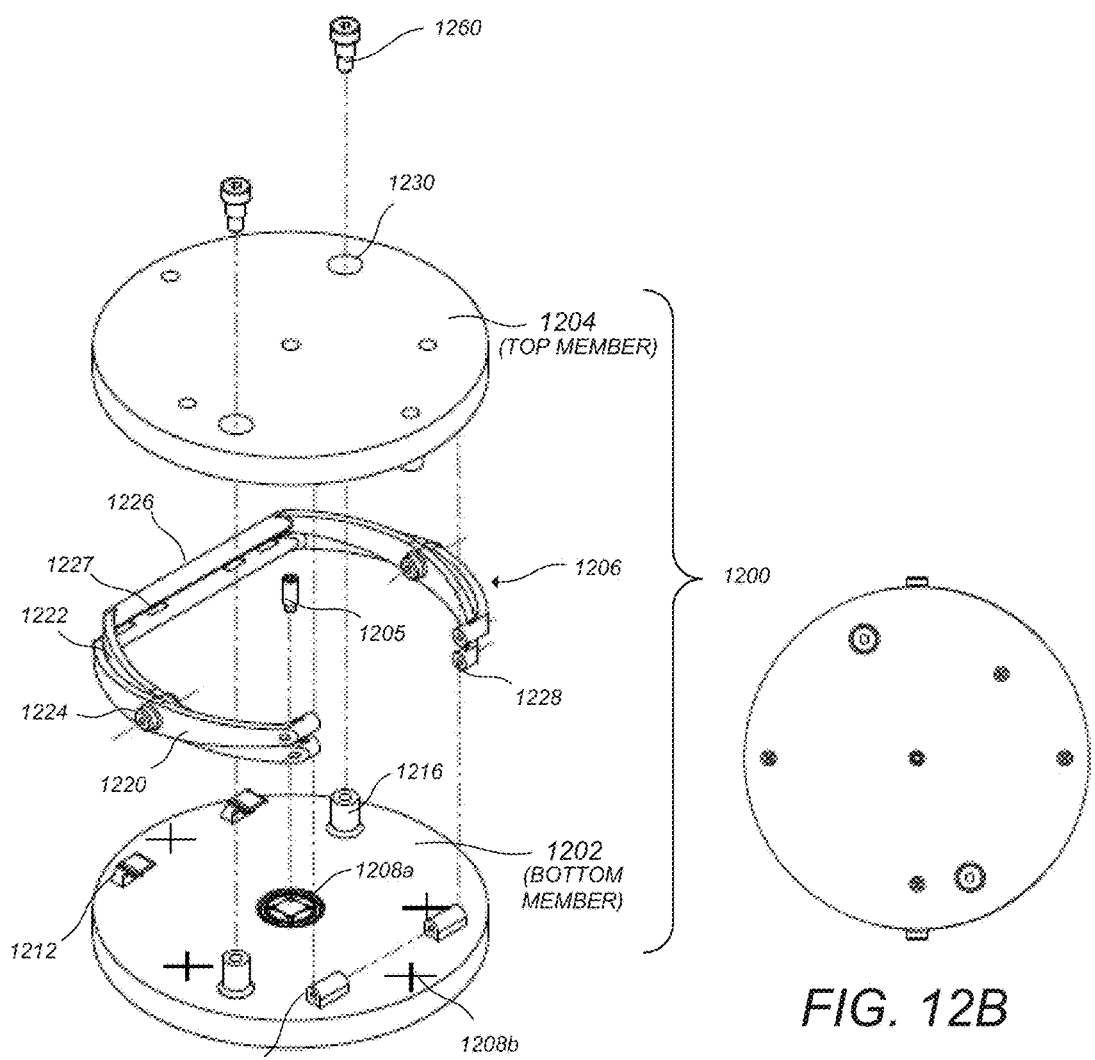

BUILDING CONTROL UNIT METHOD AND CONTROLS

BACKGROUND OF THE INVENTION

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in 5 energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Some thermostats offer programming abilities that provide the potential for balancing user comfort and energy savings. However, users are frequently intimidated by a dizzying array of switches and controls and/or the controls may provide confusing and frustrating tactile feedback. Thus, the thermostat may frequently resort to default programs, thereby reducing user satisfaction and/or energy-saving opportunities.

BRIEF SUMMARY OF THE INVENTION

Embodiments of the invention provide thermostat controls having improved tactile feedback for a user. According to one embodiment, a thermostat is provided. The thermostat may include a bottom disk-shaped member, a switch disposed on a surface of the bottom disk-shaped member, a top disk disk-shaped member, and a ring-shaped component that is rotationally coupled with the top disk-shaped member. The ring-shaped component may be configured to track a rotational input motion of a user to allow the user to scroll between options of an electronic thermostat menuing system. A motion guiding member or assembly may operationally couple the top disk-shaped member with the bottom disk-shaped member so that the top disk-shaped member is inwardly pressable by the user along a direction of an axis of rotation of the rotational input motion. This may allow the user to select an option of the interactive thermostat menuing system by contacting the switch with a component of the top disk disk-shaped member or a component coupled therewith. The motion guiding member or assembly may contact the top disk disk-shaped member near its outer periphery to control the motion of the top disk-shaped member relative to the bottom disk-shaped member.

The thermostat may further include a plurality of posts where each post is disposed through an aperture of the top disk-shaped member and coupled with the bottom disk-shaped member so that the top disk-shaped member is movable about the posts along the direction of the axis of rotation, but so that rotational movement of the top disk-shaped member about the axis of rotation is restricted or limited.

According to another embodiment, an alternative thermostat is provided. The Thermostat may include a bottom member, a switch, a top member, and a motion guiding member or assembly that operationally couples the top member with the bottom member so that the top member is inwardly pressable by a user relative to the bottom member to allow the thermostat to receive input from the user by contacting the switch with a component of, or coupled with, the top member or the bottom member. The motion guiding member or assembly may contact the top member near its outer periphery to control the inward motion of the top member relative to the bottom member.

The switch may be centrally disposed on a surface of the bottom member and the component may include a rod that is coupled with the top member. The rod may be positioned over the switch so that axial depression of the top member causes the rod to contact the switch. The thermostat may also include one or more springs disposed between the top member and the bottom member that bias the top and bottom members apart.

In one embodiment, the motion guiding member or assembly includes a plurality of stop members or studs that extend from the bottom member. The stop members are engageable with corresponding features of the top member to create a pivot point about which the top member pivots when the top member is inwardly pressed. The features of the top member may include apertures through which corresponding stop members of the bottom member are inserted. The top member may be inwardly movable relative to the stop members via the apertures and the stop members may include flanges that engage with the apertures to limit outward movement of the top member relative to the stop member. A spring may be coupled with the stop member and may bias the top and bottom members apart. A plurality of posts may be slidably disposed through corresponding apertures of the bottom member and may be coupled with the top member so rotational movement of the top member relative to the bottom member is limited or restricted.

In an alternative embodiment, the plurality of stop members may include first flanges that extend from an outer wall of the bottom member and the features of the top member may include second flanges that extend from the top member. The second flanges may be disposed inwardly of the first flanges so that outward movement of the top member relative to the bottom member causes one or more of the second flanges to engage with a corresponding first flange to create the pivot points. Similar to the above embodiment, a plurality of posts may be disposed through apertures of the top member and through apertures of the bottom member (or coupled therewith) so that rotational movement of the top member relative to the bottom member is limited or restricted.

In another embodiment, the motion guiding member or assembly includes a plurality of compliant mechanism coupled near the outer periphery of the top member. The compliant mechanisms are rigidly coupled with the top member and the bottom member and have a flexible middle portion. Each of the compliant mechanisms may include two or more longitudinally extending members and two end members. The two end members may be disposed between the longitudinally extending members and coupled therewith on opposite ends to laterally separate the longitudinally extending members. The longitudinally extending members may be flexible in the direction of the axis of rotation to provide the inward motion of the top member relative to the bottom member. The flexible middle portion may be configured to bias the top and bottom members apart. In one embodiment, one of the end members is rigidly coupled with the top member and the other end member is rigidly coupled with the bottom member.

In yet another embodiment, the motion guiding member or assembly includes a scissor mechanism that provides substantially planar inward motion of the top member relative to the bottom member. The scissor mechanism may include a first member and a second member that overlap and crisscross. The first and second members may be rotationally coupled at the crisscross locations. The scissor mechanism may axially extend and retract to provide the substantially planar motion.

In yet another embodiment, the motion guiding member or assembly includes a plurality of torsion springs that are configured to limit the rotation of an edge of the top member relative to an opposite edge of the top member to provide substantially planar inward motion of the top member relative to the bottom member. The torsion springs may be configured so that opposite ends of the torsion spring contact one of the top or bottom members while a mid-section of the torsion springs contacts the opposite member.

According to another embodiment, a method for control of an HVAC system by a thermostat is provided. The thermostat may include a top member, a bottom member, a switch, a ring-shaped user-interface component, an electronic display, and an interactive menuing system. The method may include displaying the interactive menuing system on the electronic display. The interactive menuing system may include one or more thermostat control options. The method may also include tracking rotational movement of the ring-shaped user-interface component to track at least one rotational input motion of a user and navigating between the thermostat control options of the interactive menuing system in response to the rotational movement of the ring-shaped user-interface component. The method may further include detecting, via the switch, an inward pressing of the ring-shaped user-interface component by the user corresponding to a selection of one of the thermostat control options. The inward pressing may be: (1) along a direction of an axis of rotation of the ring-shaped user-interface component and (2) controlled by a motion guiding member or assembly operationally coupled with the top member and the bottom member. The motion guiding member or assembly may contact the top member near its outer periphery to control the inward motion of the top member relative to the bottom member. The method may additionally include performing an operation of the selected thermostat control option in response to the detected inward pressing of the ring-shaped user-interface component.

According to one embodiment, the operation performed may include: displaying a sub-menu including sub-options, setting or adjusting a parameter of the thermostat control, setting or adjusting a temperature level, and setting or adjusting a time or date parameter. The inward pressing of the ring-shaped user-interface component may provide a tactile clicking feedback. The motion guiding member or assembly may be configured so that a substantially uniform tactile clicking feedback is provided regardless of where the user contacts and inwardly presses the ring-shaped user-interface component. The thermostat may be configured so that the rotational input motion and inward pressing of the ring-shaped user-interface component represent the sole physical user inputs.

According to one embodiment, the motion guiding member includes a plurality of stop members that extend from the bottom member. The plurality of stop members are engageable with corresponding features of the top member to create a pivot point, or points, about which the top member pivots when the top member is inwardly pressed. According to another embodiment, the motion guiding member or assembly includes a plurality of compliant mechanism coupled near the outer periphery of the top member. The compliant mechanisms are rigidly coupled with the top member and the bottom member and have a flexible middle portion.

BRIEF DESCRIPTION OF THE DRAWINGS

FIGS. 3A-C illustrate user adjustment of setpoint times based on rotation of the outer ring along with an ensuing user interface display according to one embodiment.

FIGS. 10B-D illustrate an exploded perspective view and assembled views of an alternative embodiment of a motion guiding assembly that includes the compliant mechanisms.

FIGS. 11A-C illustrate an exploded perspective view and assembled views of a motion guiding assembly that includes a pair of torsion bars.

FIGS. 12A-C illustrate an exploded perspective view and assembled views of a motion guiding assembly that includes a scissor mechanism.

DETAILED DESCRIPTION OF THE INVENTION

Figure 1A:
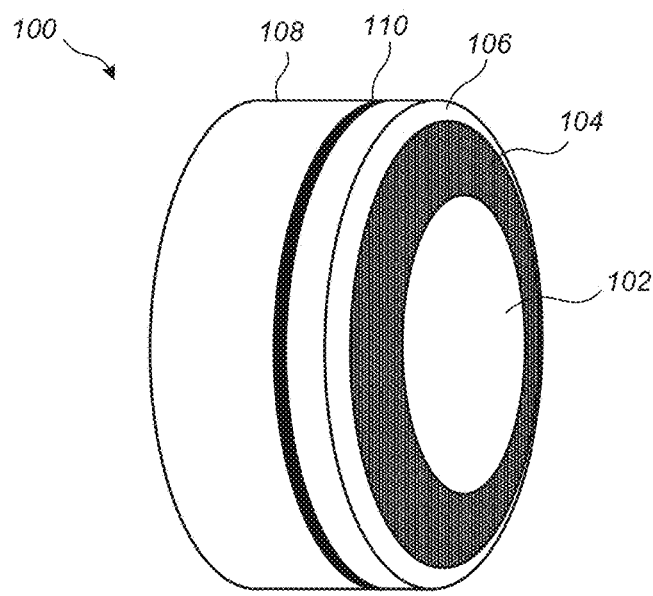
FIG. 1A illustrates a perspective view of a versatile sensing and control unit (VSCU unit) according to an embodiment.

The subject matter of this patent specification also relates to the subject matter of the following commonly assigned applications: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; U.S. Prov. Ser. No. 61/627,996 filed Oct. 21, 2011; PCT/US11/61339 filed Nov. 18, 2011; PCT/US11/61344 filed Nov. 18, 2011; PCT/US11/61365 filed Nov. 18, 2011; PCT/US11/61379 filed Nov. 18, 2011; PCT/US11/61391 filed Nov. 18, 2011; PCT/US11/61479 filed Nov. 18, 2011; PCT/US11/61457 filed Nov. 18, 2011; PCT/US11/61470 filed Nov. 18, 2011; PCT/US11/61339 filed Nov. 18, 2011; PCT/US11/61491 filed Nov. 18, 2011; PCT/US11/61437 filed Nov. 18, 2011; PCT/US11/61503 filed Nov. 18, 2011; U.S. Ser. No. 13/342,156 filed Jan. 2, 2012; PCT/US12/00008 filed Jan. 3, 2012; PCT/US12/20088 filed Jan. 3, 2012; PCT/US12/20026 filed Jan. 3, 2012; PCT/US12/00007 filed Jan. 3, 2012; U.S. Ser. No. 13/351,688 filed Jan. 17, 2012; U.S. Ser. No. 13/356,762 filed Jan. 24, 2012; PCT/US12/30084 filed Mar. 22, 2012; U.S. Ser. No. 13/434,573 filed Mar. 29, 2012; U.S. Ser. No. 13/434,560 filed Mar. 29, 2012; U.S. Ser. No. 13/440,907 filed Apr. 5, 2012; and U.S. Ser. No. 13/440,910 filed Apr. 5, 2012. Each of the above-referenced patent applications is incorporated by reference herein. The above-referenced patent applications are collectively referenced hereinbelow as "the commonly assigned incorporated applications."

In describing some of the embodiments, the specification describes the motion of a top disk-shaped member as being substantially planar relative to a bottom disk-shaped member. Substantially planar motion means that rotation of a theoretical plane of the top disk-shaped member relative to a theoretical plane of the bottom disk-shaped member is minimized or reduced. Stated another way, the top disk-shaped member's motion is such that a theoretical plane of the top disk-shaped member after movement is roughly parallel, or closely parallel, to a theoretical plane of the top disk-shaped member before movement. Substantially planar motion does not mean or imply that the top disk-shaped member experiences no rotational motion. Rather, the term suggests that such rotation is controlled and/or minimized.

Embodiments of the invention provide improved thermostat controls that provide enhanced tactile feedback for a user. This tactile feedback may be enhanced by using the herein described motion guiding assemblies, which are inserted between a top disc-shaped member and a bottom disc-shaped member of the thermostat controls. The motion guiding seemblies operationally couple the top disc-shaped member with the bottom disc-shaped member in a manner that allows the top disc-shaped member to be inwardly depressed by a user relative to the bottom disc-shaped member. The motion guiding assemblies may contact the top disc-shaped member at or near the top disc-shaped member's outer periphery to control the inward motion of the top disc-shaped member relative to the bottom disc-shaped member. A more uniform tactile click sensation and/or audible click sound is provided to the user due to the controlled and improved relative motion between the top disc-shaped member and the bottom disc-shaped member, thereby improving the overall feel, quality, and/or control of the thermostat.

Exemplary Thermostats Units and Systems

FIG. 1A illustrates a perspective view of a versatile sensing and control unit (VSCU unit) 100 according to an embodiment. VSCU unit 100 preferably has a sleek, elegant appearance that does not detract from home decoration, and indeed can serve as a visually pleasing centerpiece for the immediate location in which it is installed. VSCU unit 100 comprises a main body 108 that is preferably circular with a diameter of about 8 cm, and that has a visually pleasing outer finish, such as a satin nickel or chrome finish. Separated from the main body 108 by a small peripheral gap 110 is a cap-like structure comprising a rotatable outer ring 106, a sensor ring 104, and a circular display monitor 102.

The outer ring 106 preferably has an outer finish identical to that of the main body 108, while the sensor ring 104 and circular display monitor 102 have a common circular glass (or plastic) outer covering that is gently arced in an outward direction and that provides a sleek yet solid and durable-looking overall appearance. The outer ring 106 may be disposed along a front face of a housing of the VSCU unit 100. The front face may be circular, and the housing may be disk-like in shape. The outer ring may substantially surround the circular display monitor or substantially surround a portion of the circular display monitor visible to a user. The outer ring 106 may be generally coincident with an outer lateral periphery of said disk-like shape, as illustrated, e.g., in FIGS. 1A-1C.

The sensor ring 104 contains any of a wide variety of sensors including, without limitation, infrared sensors, visible-light sensors, and acoustic sensors. Preferably, the glass (or plastic) that covers the sensor ring 104 is smoked or mirrored such that the sensors themselves are not visible to the user. An air venting functionality is preferably provided, such as by virtue of the peripheral gap 110, which allows the ambient air to be sensed by the internal sensors without the need for visually unattractive "gills" or grill-like vents.

Figure 1B:
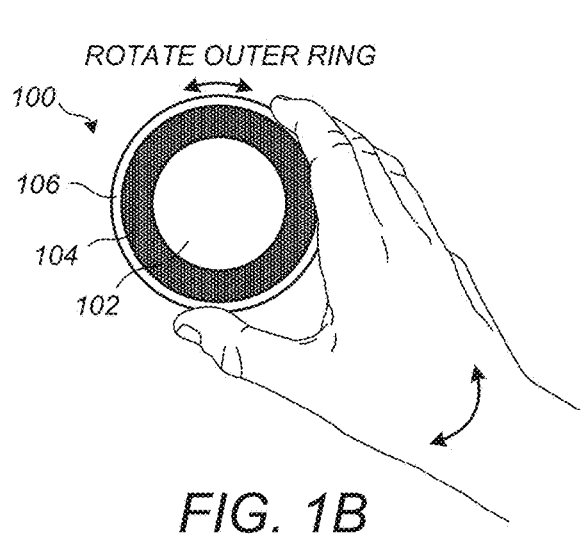
FIGS. 1B-1C illustrate the VSCU unit as it is being controlled by the hand of a user according to an embodiment.
Figure 1C:
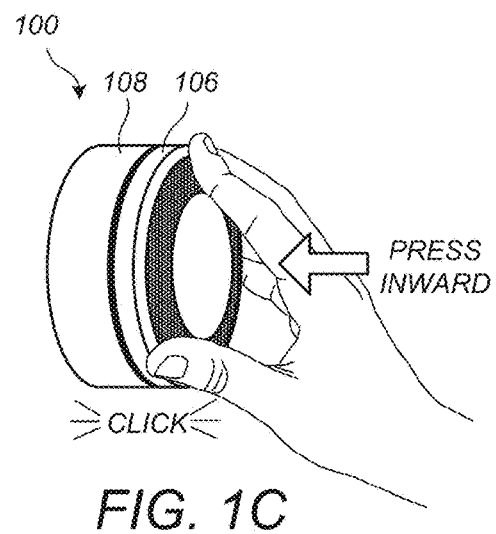

FIGS. 1B-1C illustrate the VSCU unit 100 as it is being controlled by the hand of a user according to an embodiment. In one embodiment, for the combined purposes of inspiring user confidence and further promoting visual and functional elegance, the VSCU unit 100 is controlled by only two types of user input, the first being a rotation of the outer ring 106 (FIG. 1B), and the second being an inward push on the outer ring 106 (FIG. 1C) until an audible and/or tactile "click" occurs. For some embodiments, an interior dome switch (see FIGS. 9A-12C) disposed in mechanical communication with the outer ring 106 provides the audible and/or tactile "click" associated with a completed inward pressing of the ring, the dome switch also providing an associated outward restorative force.

For one embodiment, the inward push of FIG. 1C only causes the outer ring 106 to move forward, while in another embodiment the entire cap-like structure, including both the outer ring 106 and the glass covering of the sensor ring 104 and circular display monitor 102, move inwardly together when pushed. Preferably, the sensor ring 104, the circular display monitor 102, and their common glass covering do not rotate with outer ring 106.

By virtue of user rotation of the outer ring 106 (referenced hereafter as a "ring rotation") and the inward pushing of the outer ring 106 (referenced hereinafter as an "inward click") responsive to intuitive and easy-to-read prompts on the circular display monitor 102, the VSCU unit 100 is advantageously capable of receiving all necessary information from the user for basic setup and operation. Preferably, the outer ring 106 is mechanically mounted in a manner that provides a smooth yet viscous feel to the user, for further promoting an overall feeling of elegance while also reducing spurious or unwanted rotational inputs. According to various implementations, the outer ring 106 rotates on plastic bearings and uses an optical digital encoder to measure the rotational movement and/or rotational position of the outer ring 106. In accordance with alternate implementations, other technologies such as mounting the outer ring 106 on a central shaft may be employed. For one embodiment, the VSCU unit 100 recognizes three fundamental user inputs by virtue of the ring rotation and inward click: (1) ring rotate left, (2) ring rotate right, and (3) inward click.

According to some implementations, multiple types of user input may be generated depending on the way a pushing inward of head unit front including the outer ring 106 is effectuated. In some implementations a single brief push inward of the outer ring 106 until the audible and/or tactile click occurs followed by a release (single click) can be interpreted as one type of user input (also referred to as an "inward click"). In other implementations, pushing the outer ring 106 in and holding with an the inward pressure for an amount of time such as 1-3 seconds can be interpreted as another type of user input (also referred to as a "press and hold"). According to some further implementations, other types of user input can be effectuated by a user such as double and/or multiple clicks, and pressing and holding for longer and/or shorter periods of time. According to other implementations, speed-sensitive or acceleration-sensitive rotational inputs may also be implemented to create further types of user inputs (e.g., a very large and fast leftward rotation specifies an "Away" occupancy state, while a very large and fast rightward rotation specifies an "Occupied" occupancy state).

Although the scope of the present teachings is not so limited, it is preferred that there not be provided a discrete mechanical HEAT-COOL toggle switch, or HEAT-OFF-COOL selection switch, or HEAT-FAN-OFF-COOL switch anywhere on the VSCU unit 100, this omission contributing to the overall visual simplicity and elegance of the VSCU unit 100 while also facilitating the provision of advanced control abilities that would otherwise not be permitted by the existence of such a switch. It is further highly preferred that there be no electrical proxy for such a discrete mechanical switch (e.g., an electrical push button or electrical limit switch directly driving a mechanical relay). Instead, it is preferred that the switching between these settings be performed under computerized control of the VSCU unit 100 responsive to its multi-sensor readings, its programming (optionally in conjunction with externally provided commands/data provided over a data network), and/or the above-described "ring rotation" and "inward click" user inputs.

The VSCU unit 100 comprises physical hardware and firmware configurations, along with hardware, firmware, and software programming that is capable of carrying out the functionalities described explicitly herein or in one of the commonly assigned incorporated applications. In view of the instant disclosure, a person skilled in the art would be able to realize the physical hardware and firmware configurations and the hardware, firmware, and software programming that embody the physical and functional features described herein without undue experimentation using publicly available hardware and firmware components and known programming tools and development platforms. Similar comments apply to described devices and functionalities extrinsic to the VSCU unit 100, such as devices and programs used in remote data storage and data processing centers that receive data communications from and/or that provide data communications to the VSCU unit 100. By way of example, references hereinbelow to machine learning and mathematical optimization algorithms, as carried out respectively by the VSCU unit 100 in relation to home occupancy prediction and setpoint optimization, for example, can be carried out using one or more known technologies, models, and/or mathematical strategies including, but not limited to, artificial neural networks, Bayesian networks, genetic programming, inductive logic programming, support vector machines, decision tree learning, clustering analysis, dynamic programming, stochastic optimization, linear regression, quadratic regression, binomial regression, logistic regression, simulated annealing, and other learning, forecasting, and optimization techniques.

Figure 2A:
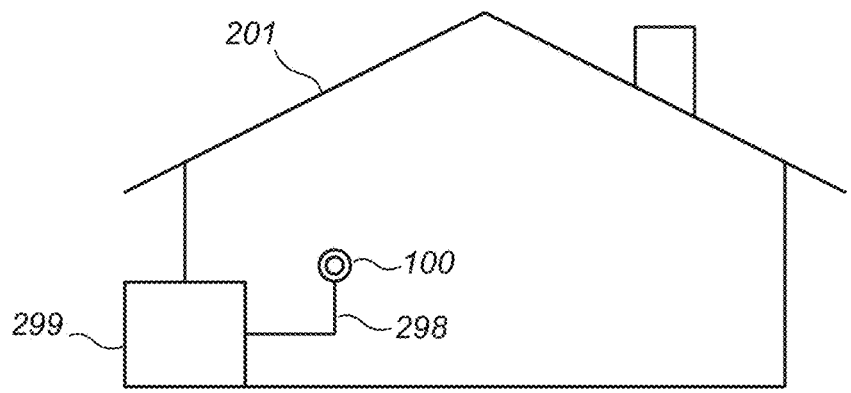
FIG. 2A illustrates the VSCU unit as installed in a house having an HVAC system and a set of control wires extending therefrom.

FIG. 2A illustrates the VSCU unit 100 as installed in a house 201 having an HVAC system 299 and a set of control wires 298 extending therefrom. The VSCU unit 100 is, of course, extremely well suited for installation by contractors in new home construction and/or in the context of complete HVAC system replacement. However, one alternative key business opportunity leveraged according to one embodiment is the marketing and retailing of the VSCU unit 100 as a replacement thermostat in an existing homes, wherein the customer (and/or an HVAC professional) disconnects their old thermostat from the existing wires 298 and substitutes in the VSCU unit 100.

In either case, the VSCU unit 100 can advantageously serve as an "inertial wedge" for inserting an entire energy-saving technology platform into the home. Simply stated, because most homeowners understand and accept the need for home to have a thermostat, even the most curmudgeonly and techno-phobic homeowners will readily accept the simple, non-intimidating, and easy-to-use VSCU unit 100 into their homes. Once in the home, of course, the VSCU unit 100 will advantageously begin saving energy for a sustainable planet and saving money for the homeowner, including the curmudgeons. Additionally, however, as homeowners "warm up" to the VSCU unit 100 platform and begin to further appreciate its delightful elegance and seamless operation, they will be more inclined to take advantage of its advanced features, and they will furthermore be more open and willing to embrace a variety of compatible follow-on products and services as are described in the incorporated applications. This is an advantageous win-win situation on many fronts, because the planet is benefitting from the propagation of energy-efficient technology, while at the same time the manufacturer of the VSCU unit and/or their authorized business partners can further expand their business revenues and prospects. For clarity of disclosure, the term "VSCU Efficiency Platform" refers herein to products and services that are technologically compatible with the VSCU unit 100 and/or with devices and programs that support the operation of the VSCU unit 100.

Some implementations of the VSCU unit 100 incorporate one or more sensors to gather data from the environment associated with the house 201. Sensors incorporated in VSCU unit 100 may detect occupancy, temperature, light and other environmental conditions and influence the control and operation of HVAC system 299. VSCU unit 100 uses a grille member (not shown in FIG. 2A) implemented in accordance with the present invention to cover the sensors. In part, the grille member of the present invention adds to the appeal and attraction of the VSCU unit 100 as the sensors in the VSCU unit 100 do not protrude, or attract attention from occupants of the house 201 and the VSCU unit 100 fits with almost any decor. Keeping sensors within the VSCU unit 100 also reduces the likelihood of damage and loss of calibration during manufacture, delivery, installation or use of the VSCU unit 100. Yet despite covering these sensors, the specialized design of the grille member facilitates accurately gathering occupancy, temperature and other data from the environment. Further details on this design and other aspects of the grille member are also described in detail later herein and/or in the incorporated applications.

Figure 2B:
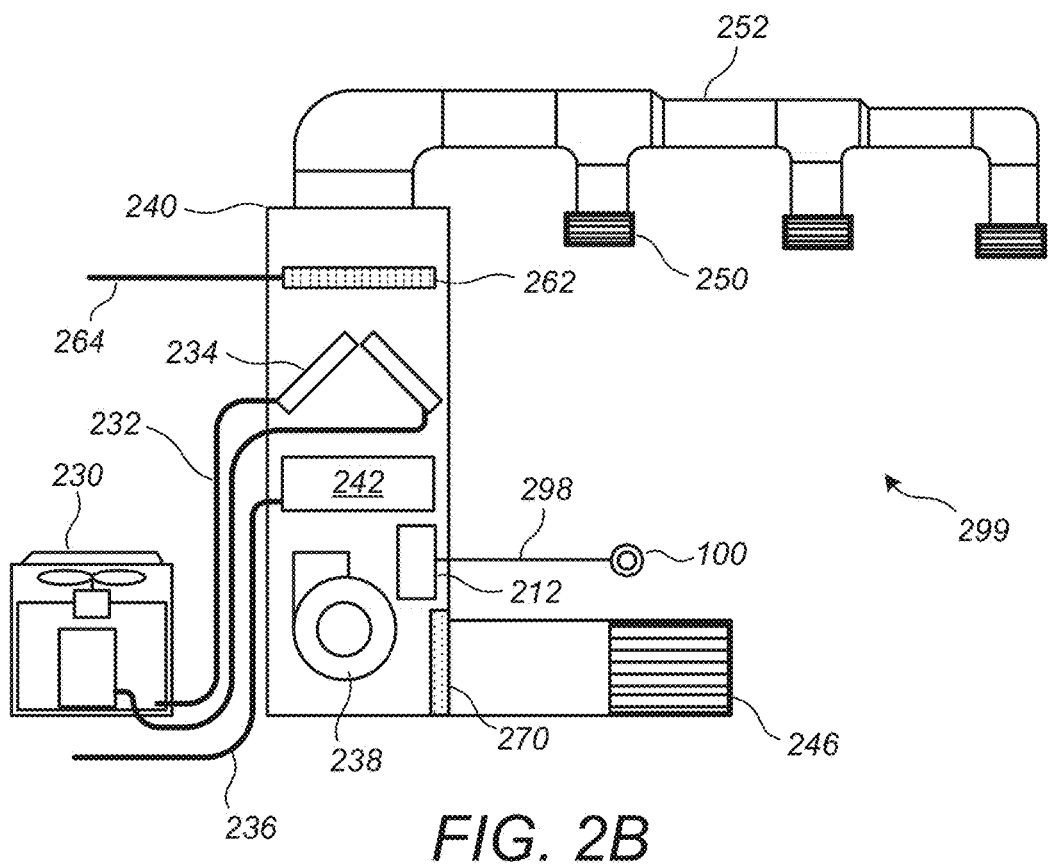
FIG. 2B illustrates an exemplary diagram of the HVAC system of FIG. 2A.

FIG. 2B illustrates an exemplary diagram of the HVAC system 299 of FIG. 2A. HVAC system 299 provides heating, cooling, ventilation, and/or air handling for an enclosure, such as the single-family home 201 depicted in FIG. 2A. The HVAC system 299 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270 using fan 238 and is heated by the heating coils or elements 242. The heated air flows back into the enclosure at one or more locations through a supply air duct system 252 and supply air grills such as grill 250. In cooling, an outside compressor 230 passes a gas such as Freon through a set of heat exchanger coils to cool the gas. The gas then goes via line 232 to the cooling coils 234 in the air handlers 240 where it expands, cools and cools the air being circulated through the enclosure via fan 238. According to some embodiments a humidifier 262 is also provided which moistens the air using water provided by a water line 264. Although not shown in FIG. 2B, according to some embodiments the HVAC system for the enclosure has other known components such as dedicated outside vents to pass air to and from the outside, one or more dampers to control airflow within the duct systems, an emergency heating unit, and a dehumidifier.

The HVAC system is selectively actuated via control electronics 212 that communicate with the VSCU unit 100 over control wires 298. Thus, for example, as known in the art, for a typical simple scenario of a four-wire configuration in which the control wires 298 consist of power (R), heat (W), cool (Y), and fan (G), the VSCU unit 100 will short-circuit W to R to actuate a heating cycle (and then disconnect W from R to end the heating cycle), will short-circuit Y to R to actuate a cooling cycle (and then disconnect Y from R to end the cooling cycle), and will short-circuit G to R to turn on the fan (and then disconnect G from R to turn off the fan). For a heating mode, when VSCU unit 100 determines that an ambient temperature is below a lower threshold value equal to a setpoint temperature minus a swing value, the heating cycle will be actuated until the ambient temperature rises to an upper threshold value equal to the setpoint value plus the swing value. For a cooling mode, when VSCU unit 100 determines that an ambient temperature is above an upper threshold value equal to a setpoint temperature plus a swing value, the cooling cycle will be actuated until the ambient temperature lowers to a lower threshold value equal to the setpoint value minus the swing value. Without limitation, the swing values for heating and cooling can be the same or different, the upper and lower swing amounts can be symmetric or asymmetric, and the swing values can be fixed, dynamic, or user-programmable, all without departing from the scope of the present teachings.

Figure 4A:
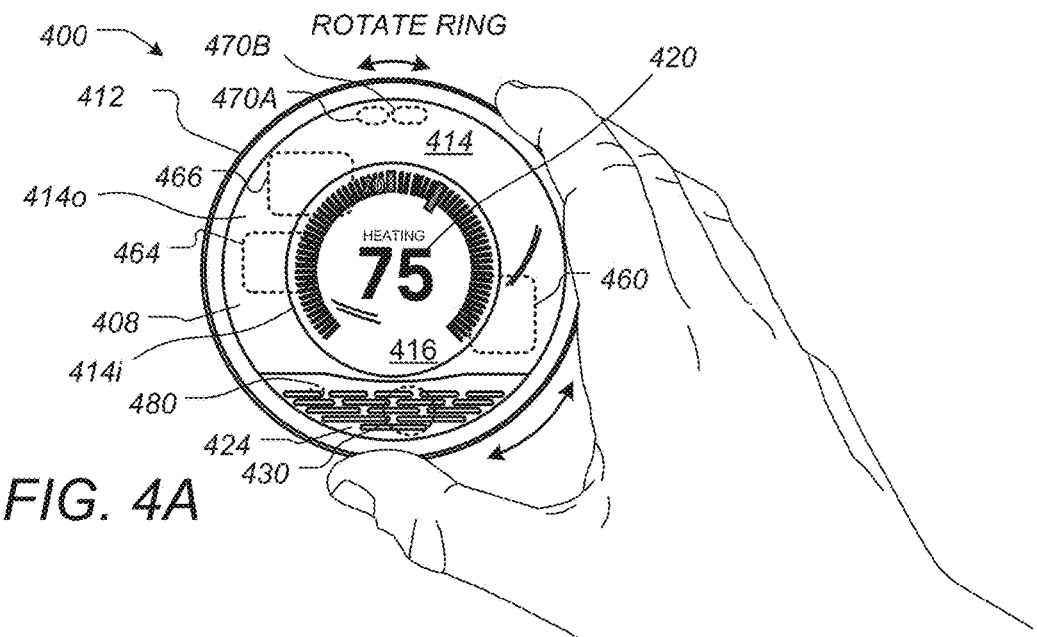
FIGS. 4A-4B illustrate a thermostat having a user-friendly interface, according to some embodiments.
Figure 4B:
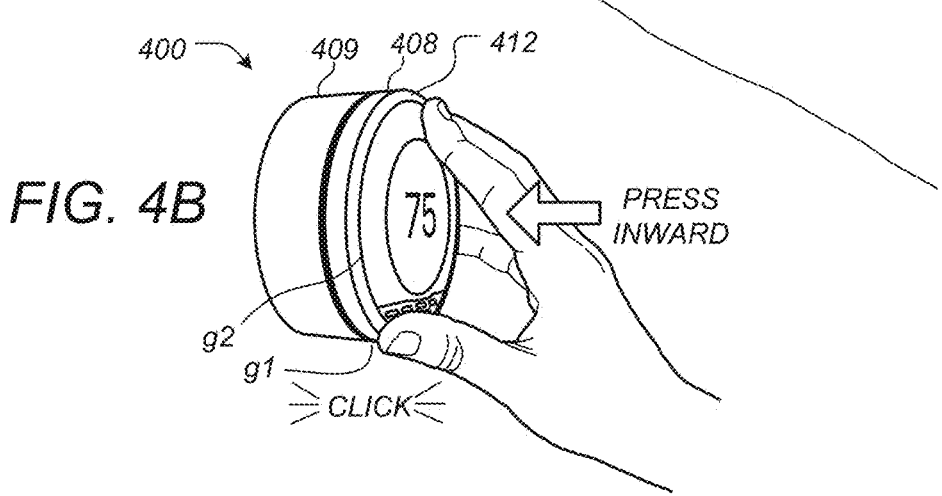

FIGS. 4A-B illustrate a thermostat 400 having a user-friendly interface, according to some embodiments. Unlike many prior art thermostats, thermostat 400 preferably has a sleek, simple, uncluttered and elegant design that does not detract from home decoration, and indeed can serve as a visually pleasing centerpiece for the immediate location in which it is installed. Moreover, user interaction with thermostat 400 is facilitated and greatly enhanced over known conventional thermostats by the design of thermostat 400. The thermostat 400 includes control circuitry and is electrically connected to an HVAC system, such as is shown with unit 100 in FIGS. 1 and 2. Thermostat 400 is wall mounted, is circular in shape, and has an outer rotatable ring 412 for receiving user input. Thermostat 400 is circular in shape in that it appears as a generally disk-like circular object when mounted on the wall. Thermostat 400 has a large front face lying inside the outer ring 412. According to some embodiments, thermostat 400 is approximately 80 mm in diameter.

The outer rotatable ring 412 allows the user to make adjustments, such as selecting a new target temperature. For example, by rotating the outer ring 412 clockwise, the target temperature can be increased, and by rotating the outer ring 412 counter-clockwise, the target temperature can be decreased. The thermostat 400 may be configured to receive a plurality of types of inputs by virtue of the rotatable ring 412, such as a scrolling input and a selection input. For example, a rotation of the ring may allow a user to scroll through an array of selection options, and inwards pressure exerted on the ring (inward click) may allow a user to select one of the options (e.g., corresponding to a particular scroll position).

The outer rotatable ring 412 may include a component that may be physically rotated, or, in other embodiments, a static component that may sense a user's virtual rotation of the ring. For some embodiments, the outer rotatable ring 412 may include a touch pad configured to track arcuate motion of a user's finger on the touch pad. The touch pad may comprise, e.g., a ring-shaped or circular area. In some instances, the touch pad includes multiple portions (e.g., to detect arcuate motion in a first ring-shaped area and to detect tapping in a second inner circular area). Boundaries of a touch pad area may be identified to a user using, e.g., visual or tactile cues. For example, a ring-shaped touchpad area may be indented compared to neighboring areas on the thermostat 400, or the area may be a different color than neighboring areas.

For preferred embodiments such as those of FIG. 4A in which the outer ring 412 is a continuous loop without fiducial markers, one or more advantages are brought about. Thus, a user may physically rotate the ring (in embodiments in which the ring is configured to be physically rotatable)

regardless of a starting position of the ring. Further, a user may select, e.g., a value of a variable (e.g., select a particular menu, a particular setpoint temperature value, etc.) by rotating the ring multiple times. This feature may be particularly advantageous as the user need not worry about precise rotations in order to select a desired option.

The front face of the thermostat 400 comprises a clear cover 414 that according to some embodiments is polycarbonate, and a metallic portion 424 preferably having a number of slots formed therein as shown. According to some embodiments, the surface of cover 414 and metallic portion 424 form a common outward arc or spherical shape gently arcing outward, and this gentle arcing shape is continued by the outer ring 412.

Although being formed from a single lens-like piece of material such as polycarbonate, the cover 414 has two different regions or portions including an outer portion 414o and a central portion 414i. According to some embodiments, the cover 414 is painted or smoked around the outer portion 414o, but leaves the central portion 414i visibly clear so as to facilitate viewing of an electronic display 416 disposed thereunderneath. According to some embodiments, the curved cover 414 acts as a lens that tends to magnify the information being displayed in electronic display 416 to users. According to some embodiments the central electronic display 416 is a dot-matrix layout (individually addressable) such that arbitrary shapes can be generated, rather than being a segmented layout. According to some embodiments, a combination of dot-matrix layout and segmented layout is employed. According to some embodiments, central display 416 is a backlit color liquid crystal display (LCD). An example of information displayed on the electronic display 416 is illustrated in FIG. 4A, and includes central numerals 420 that are representative of a current setpoint temperature.

Particular presentations displayed on the electronic display 416 may depend on detected user input. For example, one of a plurality of variables (e.g., current setpoint temperature versus learning status) or variable values (e.g., 65 degrees versus 75 degrees) may be displayed. The one being displayed may depend on a user's rotation of the outer rotatable ring 412. Thus, for example, when the device is configured to display a current setpoint temperature, the value being displayed may gradually increase as the user rotates the ring in a clockwise direction. The sign of the change in the displayed temperature may depend on whether the user is rotating the ring in a clockwise or counterclockwise direction. The speed at which the displayed temperature is changing may depend (e.g., in a linear manner) on the speed at which the user is rotating the ring.

A displayed characteristic may vary depending on received user input. For example, a displayed temperature may increase as a user rotates the outer rotatable ring 412 clockwise, or a highlighted indicator may progress across a list of displayed options as the user rotates the ring 412. Further, or additionally, user inputs may cause the appearance of new types of information. For example, if a user is viewing setpoint-temperature options, a dramatic clockwise rotation may cause a flashing red symbol (to convey an anti-environmental message). Thus, a relationship may exist between a single type of user input (e.g., ring rotation) and a change in an active variable (e.g., setpoint temperature changes), and relationships may further exist between the single type of user input and an inactive variable (e.g., an environmental warning flag). The latter relationship may be indirect and depend on a value or change in values of the active variable.

The presentations on the electronic display 416 may depend on one or more types of user input. For example, the display may change in a first manner (e.g., to show a varying selection option) as a user rotates the outer rotatable ring 412 and may change in a second manner (e.g., to confirm a selection or default to a menu screen) as the user exerts inwards pressure on the outer rotatable ring 412.

According to some embodiments, metallic portion 424 has number of slot-like openings so as to facilitate the use of a passive infrared motion sensor 430 mounted therebeneath. The metallic portion 424 can alternatively be termed a metallic front grille portion. Further description of the metallic portion/front grille portion is provided in the commonly assigned U.S. Ser. No. 13/199,108, supra. The design of the metallic portion 424 compliments the sleek, simple, uncluttered and elegant design of thermostat 400 while facilitating the integration and operation of sensors located within a housing of the thermostat. In the implementation as illustrated, thermostat 400 is enclosed by housing with a forward-facing surface including the cover 414 and the metallic portion 424. Some implementations of the housing include a back plate and a head unit. The housing provides an attractive and durable configuration for one or more integrated sensors used by thermostat 400 and contained therein. In some implementations, the metallic portion 424 may be flush-mounted with the cover 414 on the forward-facing surface of housing. Together the metallic portion 424 as incorporated in housing does not detract from home or commercial decor, and indeed can serve as a visually pleasing centerpiece for the immediate location in which it is located.

The metallic portion 424 is designed to conceal sensors from view promoting a visually pleasing quality of the thermostat yet permitting them to receive their respective signals. Openings in the metallic portion 424 along the forward-facing surface of the housing allow signals to pass through that would otherwise not pass through the cover 414. For example, glass, polycarbonate or other similar materials used for cover 414 are capable of transmitting visible light but are highly attenuating to infrared energy having longer wavelengths in the range of 10 microns, which is the radiation band of operation for many passive infrared (PIR) occupancy sensors. Notably, included in the thermostat 400, according to some preferred implementations, is an ambient light sensor (not shown) and an active proximity sensor (not shown) positioned near the top of the thermostat just behind the cover 414. Unlike PIR sensors, the ambient light sensor and active proximity sensor are configured to detect electromagnetic energy in the visible and shorter-infrared spectrum bands having wavelengths less than 1 micron, for which the glass or polycarbonate materials of the cover 414 are not highly attenuating. In some implementations, the metallic portion 424 includes openings in accordance with one or more implementations that allow the longer-wavelength infrared radiation to pass through the openings towards a passive infrared (PIR) motion sensor 430 as illustrated. Because the metallic portion 424 is mounted over the radiation receiving surface of PIR motion sensor 430, PIR motion sensor 430 continues to receive the longer wavelength infrared radiation through the openings and detect occupancy in an enclosure.

Additional implementations of the metallic portion 424 also facilitate additional sensors to detect other environmental conditions. The metallic portion may at least partly conceal and/or protect one or more such sensors. In some implementations, the metallic portion 424 helps a temperature sensor situated inside of the thermostat's housing measure the ambient temperature of air. Openings in the metallic portion 424 promote air flow towards a temperature sensor located below the metallic portion 424 thus conveying outside temperatures to the interior of the housing. In further implementations, the metallic portion 424 may be thermally coupled to a temperature sensor promoting a transfer of heat from outside the housing.

The thermostat 400 is preferably constructed such that the electronic display 416 is at a fixed orientation and does not rotate with the outer ring 412, so that the electronic display 416 remains easily read by the user. For some embodiments, the cover 414 and metallic portion 424 also remain at a fixed orientation and do not rotate with the outer ring 412. According to one embodiment in which the diameter of the thermostat 400 is about 80 mm, the diameter of the electronic display 416 is about 45 mm. According to some embodiments an LED indicator 480 is positioned beneath portion 424 to act as a low-power-consuming indicator of certain status conditions. For, example the LED indicator 480 can be used to display blinking red when a rechargeable battery of the thermostat is very low and is being recharged. More generally, the LED indicator 480 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430, supra. According to some embodiments, occupancy information is used in generating an effective and efficient scheduled program. Preferably, an active proximity sensor 470A is provided to detect an approaching user by infrared light reflection, and an ambient light sensor 470B is provided to sense visible light. The proximity sensor 470A can be used to detect proximity in the range of about one meter so that the thermostat 400 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place. The ambient light sensor 470B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the thermostat 400 is controlled by only two types of user input, the first being a rotation of the outer ring 412 as shown in FIG. 4A (referenced hereafter as a "rotate ring" or "ring rotation" input), and the second being an inward push on an outer cap 408 (see FIG. 4B) until an audible and/or tactile "click" occurs (referenced hereafter as an "inward click" or simply "click" input). For the embodiment of FIGS. 4A-4B, the outer cap 408 is an assembly that includes all of the outer ring 412, cover 414, electronic display 416, and metallic portion 424. When pressed inwardly by the user, the outer cap 408 travels inwardly by a small amount, such as 0.5 mm, against an interior metallic dome switch (not shown), and then spring- ably travels back outwardly by that same amount when the inward pressure is released, providing a satisfying tactile "click" sensation to the user's hand, along with a corresponding gentle audible clicking sound. Thus, for the embodiment of FIGS. 4A-4B, an inward click can be achieved by direct pressing on the outer ring 412 itself, or by indirect pressing of the outer ring by virtue of providing inward pressure on the cover 414, metallic portion 424, or by various combinations thereof. For other embodiments, the thermostat 400 can be mechanically configured such that only the outer ring 412 travels inwardly for the inward click input, while the cover 414 and metallic portion 424 remain motionless. It is to be appreciated that a variety of different selections and combinations of the particular mechanical elements that will travel inwardly to achieve the "inward click" input are within the scope of the present teachings, whether it be the outer ring 412 itself, some part of the cover 414, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 412 has been found particularly advantageous, since the user's fingers do not need to be lifted out of contact with the device, or slid along its surface, in order to go between ring rotations and inward clicks. Moreover, by virtue of the strategic placement of the electronic display 416 centrally inside the rotatable ring 412, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature or selection of other thermostat controls, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra, U.S. Ser. No. 29/386,021, supra, and U.S. Ser. No. 13/199,108, supra.

Figure 4C:
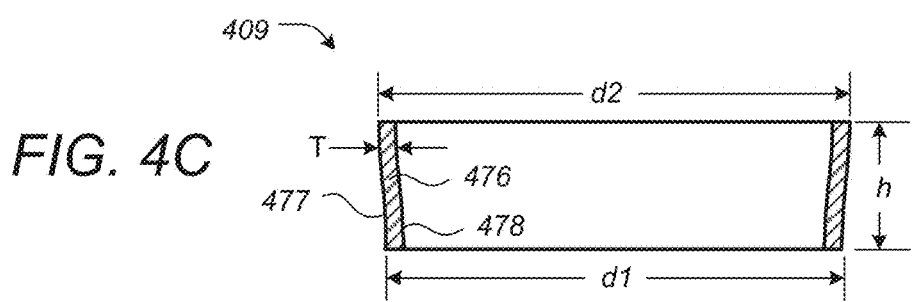
FIG. 4C illustrates a cross-sectional view of a shell portion of a frame of the thermostat of FIGS. 4A-B.

FIG. 4C illustrates a cross-sectional view of a shell portion 409 of a frame of the thermostat of FIGS. 4A-B, which has been found to provide a particularly pleasing and adaptable visual appearance of the overall thermostat 400 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 409 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 409 has the shape of a frustum that is gently curved when viewed in cross-section, and comprises a sidewall 476 that is made of a clear solid material, such as polycarbonate plastic. The sidewall 476 is backpainted with a substantially flat silver- or nickel-colored paint, the paint being applied to an inside surface 478 of the sidewall 476 but not to an outside surface 477 thereof. The outside surface 477 is smooth and glossy but is not painted. The sidewall 476 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 4C. The outer ring 412 of outer cap 408 is preferably constructed to match the diameter d2 where disposed near the second end of the shell portion 409 across a modestly sized gap g1 therefrom, and then to gently arc back inwardly to meet the cover 414 across a small gap g2. It is to be appreciated, of course, that FIG. 4C only illustrates the outer shell portion 409 of the thermostat 400, and that there are many electronic components internal thereto that are omitted from FIG. 4C for clarity of presentation, such electronic components being described further hereinbelow and/or in other ones of the commonly assigned incorporated applications, such as U.S. Ser. No. 13/199,108, supra.

According to some embodiments, the thermostat 400 includes a processing system 460, display driver 464 and a wireless communications system 466. The processing system 460 may be disposed within a housing of thermostat 400, coupled to one or more temperature sensors of thermostat 400 and/or coupled to rotatable ring 412. The processing system 460 may be configured to dynamically identify user input via rotatable ring 412, dynamically identifying a variable value (e.g., a setpoint temperature value), and/or dynamically identify an HVAC-control-related property. The processing system 460 may be configured and programmed to provide an interactive thermostat menuing system (e.g., such as the menuing system shown in FIG. 3) on display area 416 responsive to an inward pressing of rotatable ring 412 and/or to provide user navigation within the interactive thermostat menuing system based on rotation of rotatable ring 412 and inward pressing of rotatable ring 412 (e.g., such as is described in relation to FIG. 3). The processing system 460 may be adapted to cause the display driver 464 and display area 416 to display information to the user and/or to receive user input via the rotatable ring 412.

For example, an active variable (e.g., variable-value selection, setpoint selection, zip-code selection) may be determined based on a default state, smart logic or previously received user input. A relationship between the variable and user input may be identified. The relationship may be, e.g., linear or non-linear, continuous or discrete, and/or saturating or non-saturating. Such relationships may be pre-defined and stored within the thermostat. User input may be detected. Analysis of the user input may include, e.g., identifying: a type of user input (tapping versus rotation), a degree of input (e.g., a degree of rotation); a final input position (e.g., a final angular position of the rotatable ring); an input location (e.g., a position of a tapping); and/or a speed of input (e.g., a speed of rotation). Using the relationship, the processing system 460 may then determine a display indicator, such as a digital numerical value representative of an identified value of a variable (e.g., a setpoint temperature). The display indicator may be displayed on display area 416. For example, a digital numerical value representative of a setpoint temperature to be displayed may be determined based on a prior setpoint value and a saturating and continuous relationship between rotation input and the temperature. The displayed value may be, e.g., numeric, textual or graphical.

The processing system 460 may further set a variable value in accordance with a user selection. For example, a particular type of user input (e.g., inwards pressure exertion) may be detected. A value of a selected variable may be determined based on, e.g., a prior ring rotation, displayed variable value, etc. The variable may then be set to this value.

The processing system 460, according to some embodiments, is capable of carrying out the governance of the operation of thermostat 400 including the user interface features described herein. The processing system 460 is further programmed and configured to carry out other operations as more fully described in the commonly assigned incorporated applications. For example, processing system 460 is further programmed and configured to maintain and update a thermodynamic model for the enclosure in which the HVAC system is installed, such as described in U.S. Ser. No. 12/881,463, supra. According to some embodiments, the wireless communications system 466 is used to communicate with devices such as personal computers and/or other thermostats or HVAC system components, which can be peer-to-peer communications, communications through one or more servers located on a private network, and/or communications through a cloud-based service.

Exemplary Thermostat Menuing System and Functions

FIGS. 3A-3C show exemplary screens of an interactive thermostat menuing system that include a rotatable main menu, according to some preferred embodiments. The exemplary screens show a user navigating through the interactive thermostat menuing system to select one or more thermostat control options, such as during programming of the thermostat. Additional exemplary screens are shown and described in the above mentioned applications, which are incorporated by reference. These additional exemplary screens show and describe various other operations that may be performed via the "ring rotations" and "inward clicks" functions of the thermostat. Such additional operations may include setting and/or adjusting a temperature setting and the like. As described in further detail below, the menuing system may be accessible to a user by an inward pressing of ring 106 (i.e. an inward click), and the user may be able to navigate through the menuing system by virtue of rotations and inward clicks of the outer ring 106.

The screens shown, according to some embodiments, are displayed on a thermostat 100 on a round dot-matrix electronic display 102 having a rotatable ring 106. FIG. 3A shows an example screen 300 in normal operations. An inward click from the normal display screen 300 causes a circumferential main menu 320 to appear as shown in screen 301. In this example the main menu 320 displays about the perimeter of the circular display area various menu names such as "SETTINGS," "ENERGY," "SCHEDULE," "AWAY," "DONE," as well one or more icons. The top of the circular menu 320 includes an active window 322 that shows the user which menu item will be selected if an inward click is performed at that time. Window 322 is highlighted, filled in, circumscribed, or otherwise marked such that a user can easily identify that a menu item within this window is active.

Upon user rotation of the rotatable ring 106, the menu items turn clockwise or counter clockwise, matching the direction of the rotatable ring 106, so as to allow different menu items to be selected. For example, screen 302 and 304 show examples displayed in response to a clockwise rotation of the rotatable ring 106. One example of a rotating menu that rotates responsive to ring rotations according to some embodiments is illustrated in the commonly assigned U.S. Ser. No. 29/399,632, supra. From screen 304, if an inward click is performed by the user, then the Settings menu is entered. It has been found that a circular rotating menu such as shown, when combined with a rotatable ring and round display area, allows for highly intuitive and easy input, and so therefore greatly enhances the user interface experience for many users.

Menu items may include text (e.g., "Schedule") and/or icons (e.g., disks 310 and 312). FIG. 3B shows an example screen 306 that allows for the schedule mode to be entered. FIG. 3C shows the selection of a mode icon 309 representing a heating/cooling/off mode screen, the mode icon 309 comprising two disks 310 and 312 and causing the display of a mode menu if it appears in the active window 322 when the user makes an inward click. In screen 308, a small blue disk 310 represents cooling mode and a small orange-red disk 312 represents heating mode. According to some embodiments the colors of the disks 310 and 312 match the background colors used for the thermostat.

Menu items may further indicate a currently active selection or mode of operation. For example, one of disks 310 and 312, in this case the heating disk 312, is highlighted with a colored outline, to indicate the current operating mode (i.e. heating or cooling) of the thermostat. In one alternative embodiment, the mode icon 309 can be replaced with the text string "HEAT/COOL/OFF" or simply the word "MODE".

If in inward click is performed from screen 308, a menu screen 314 appears (e.g. using a "coin flip" transition). In screen 514 the user can view the current mode (marked with a check mark). Screen 314 illustrates another way in which rotatable ring 106 may be used to make a selection. A plurality of selection options may be presented, with one or more options being emphasized (e.g., highlighted). A user may highlight a different option by rotating rotatable ring 106. For example, as a user rotates rotatable ring 106 in a clockwise fashion, options further down the list become highlighted. Once the user is satisfied that the desired option is highlighted, they may click the ring to confirm the selection. Thus, in the example shown in screen 314, a user may rotate rotatable ring 106 clockwise to move the highlighting from "HEAT" to "COOL" or "OFF." The user may then establish the selection by clicking the ring, and thereby change the mode. If "COOL" is selected then the thermostat will change over to cooling mode (such changeover as might be performed in the springtime), and the cooling disk icon will highlighted on screens 314 and 308. The menu can also be used to turn the thermostat off by selecting "OFF." In cases the connected HVAC system only has heating or cooling but not both, the words "HEAT" or "COOL" or "OFF" are displayed on the menu 320 instead of the colored disks.

Exemplary Thermostat Components

Figure 5A:
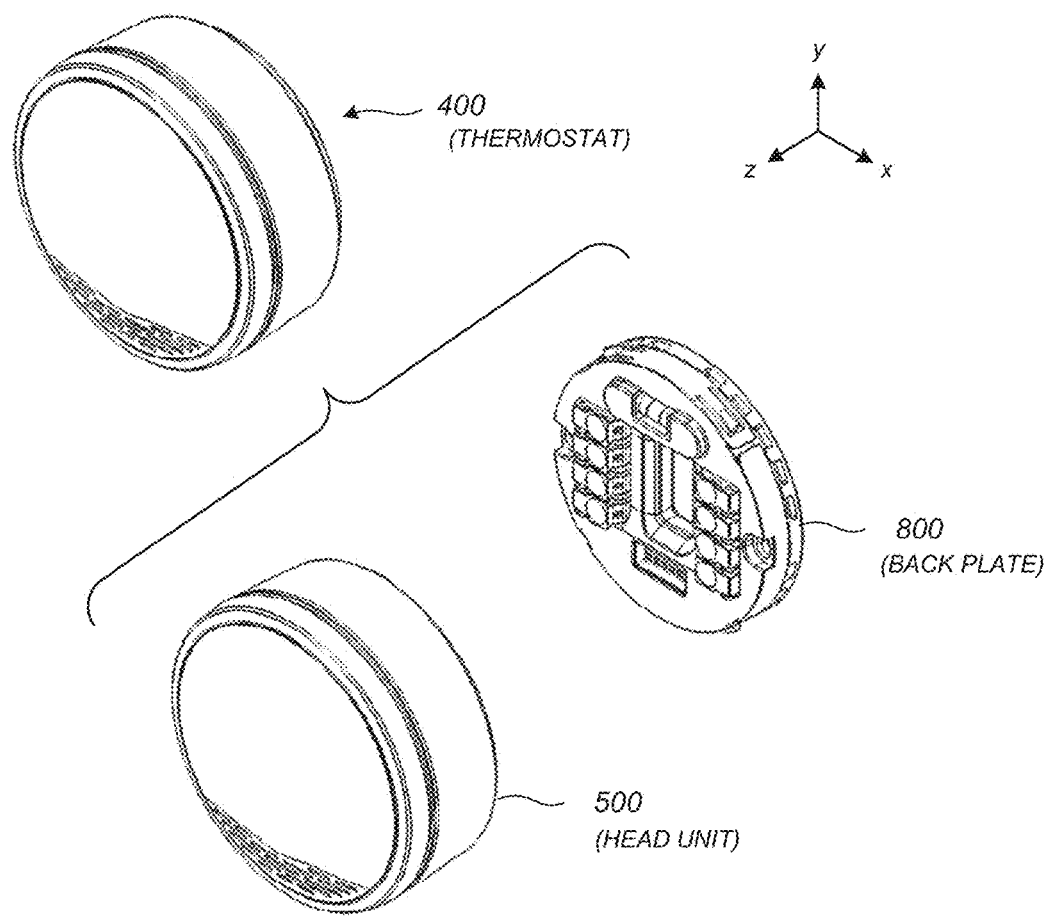
FIGS. 5A-5B illustrate exploded front and rear perspective views, respectively, of a thermostat with respect to its two main components, which are the head unit and the back plate.
Figure 5B:
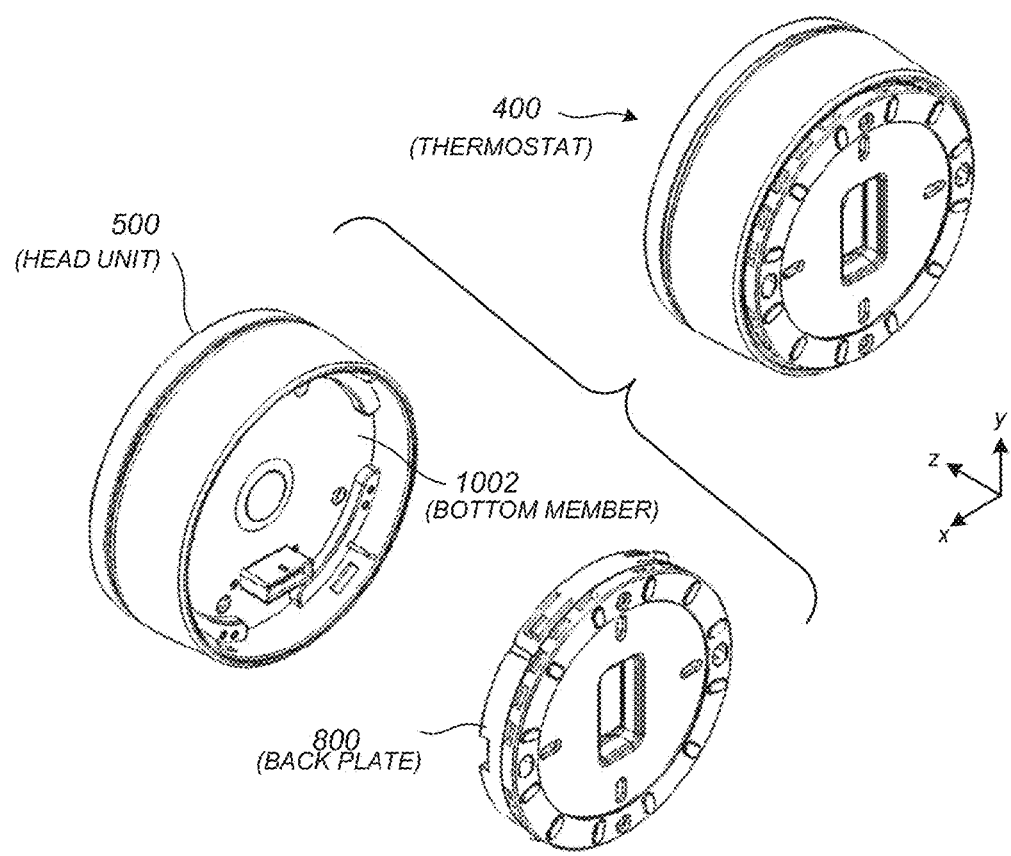

FIGS. 5A-5B illustrate exploded front and rear perspective views, respectively, of the thermostat 400 with respect to its two main components, which are the head unit 500 and the back plate 800. Further technical and/or functional descriptions of various ones of the electrical and mechanical components illustrated hereinbelow can be found in one or more of the commonly assigned incorporated applications, such as U.S. Ser. No. 13/199,108, supra. In the drawings shown, the "z" direction is outward from the wall, the "y" direction is the head-to-toe direction relative to a walk-up user, and the "x" direction is the user's left-to-right direction. FIG. 5B further illustrates a bottom member 1002 of a motion guiding assembly that is configured to control of an inward motion between outer ring 520 and/or a cover (e.g., 414) and back plate 800 as the described "inward click" is performed. The motion guiding assembly is described in greater detail below with respect to FIGS. 9A-12C.

Figure 6A:
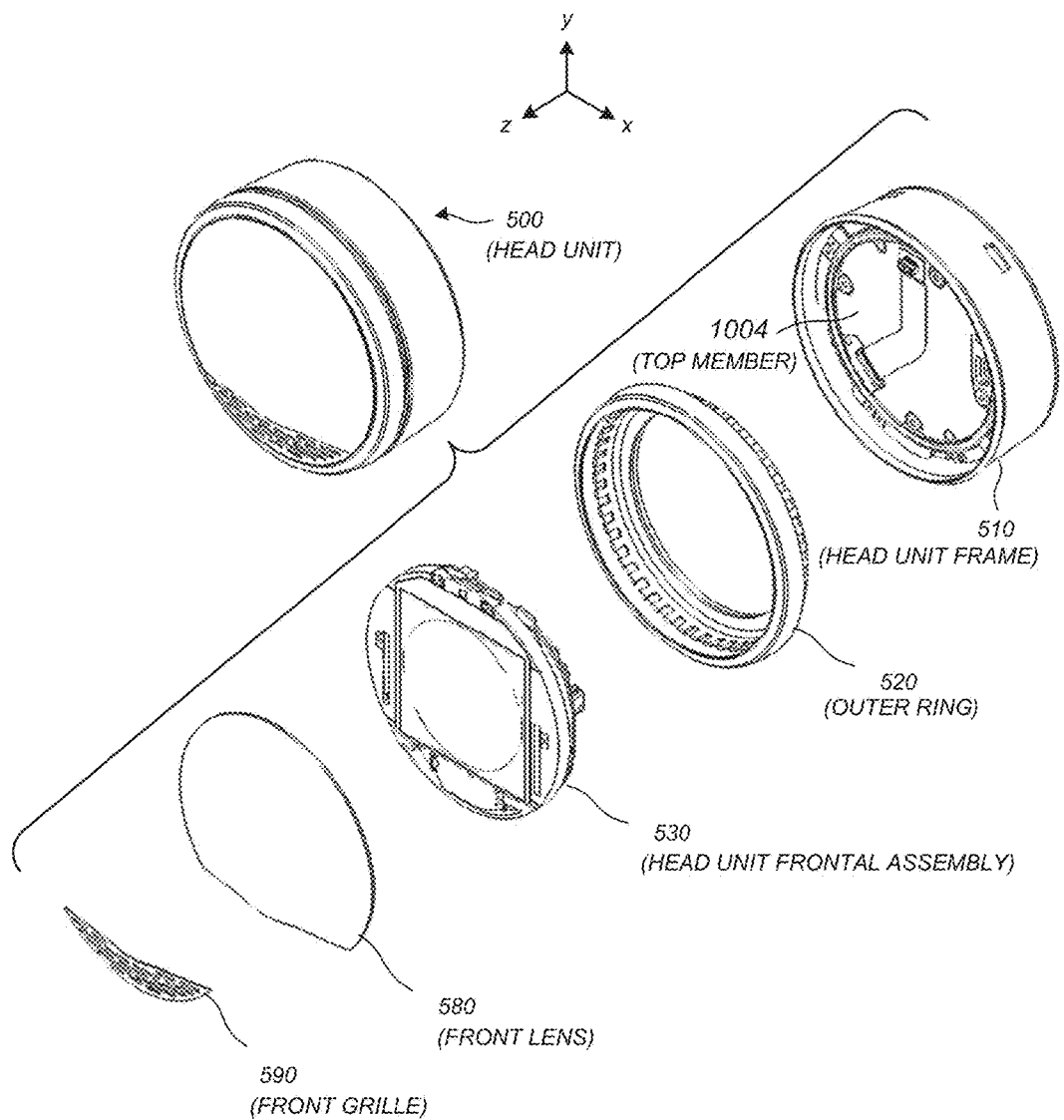
FIGS. 6A-6B illustrate exploded front and rear perspective views, respectively, of the head unit with respect to its primary components.
Figure 6B:
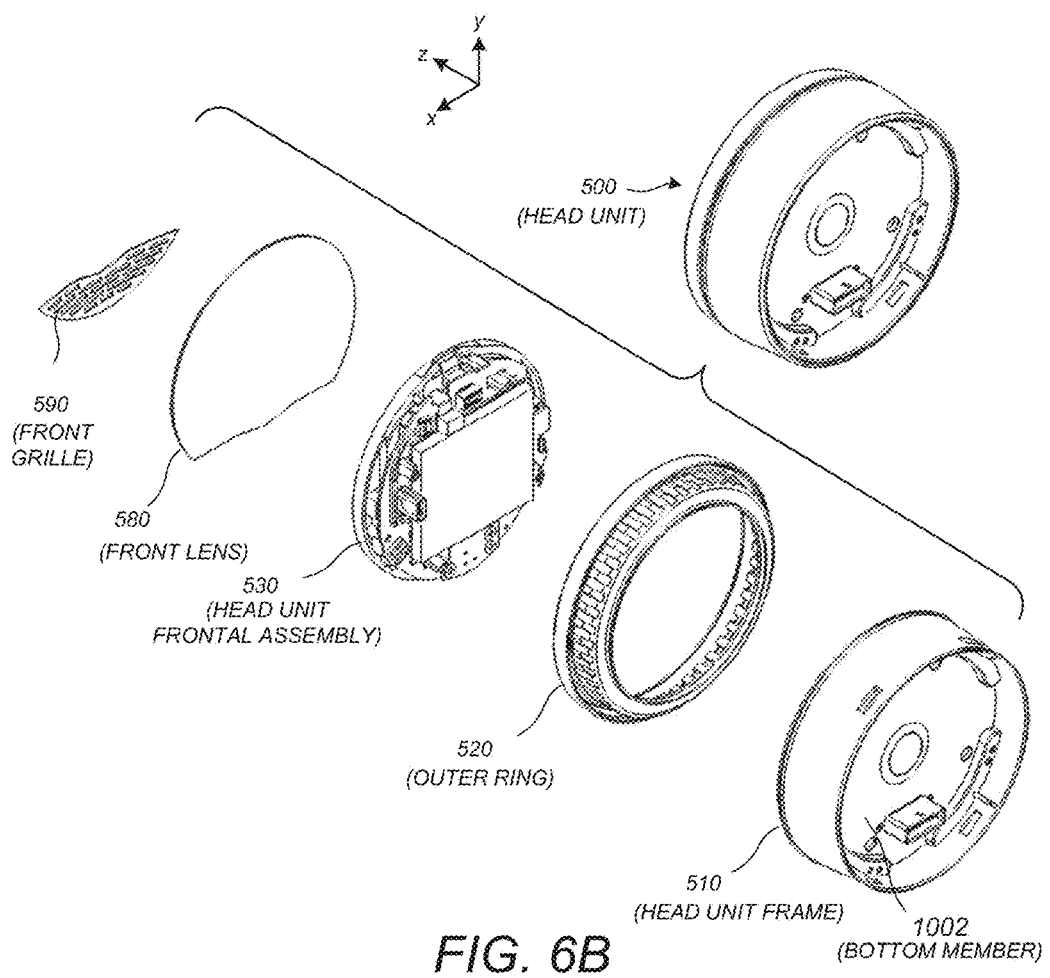

FIGS. 6A-6B illustrate exploded front and rear perspective views, respectively, of the head unit 500 with respect to its primary components. Head unit 500 includes a head unit frame 510, the outer ring 520 (which is manipulated for ring rotations), a head unit frontal assembly 530, a front lens 580, and a front grille 590. Electrical components on the head unit frontal assembly 530 can connect to electrical components on the back plate 800 by virtue of ribbon cables and/or other plug type electrical connectors. Head unit frontal assembly 530 is slidably mounted and secured to head unit frame urging the outer ring 520 to be held between the head unit frontal assembly 530 and the head unit frame. FIGS. 6A-6B further illustrates bottom member 1002 and top member 1004 of a motion guiding assembly that controls inward motion of outer ring 520 and/or the cover relative to back plate 800 as the "inward click" is performed.

Figure 7A:
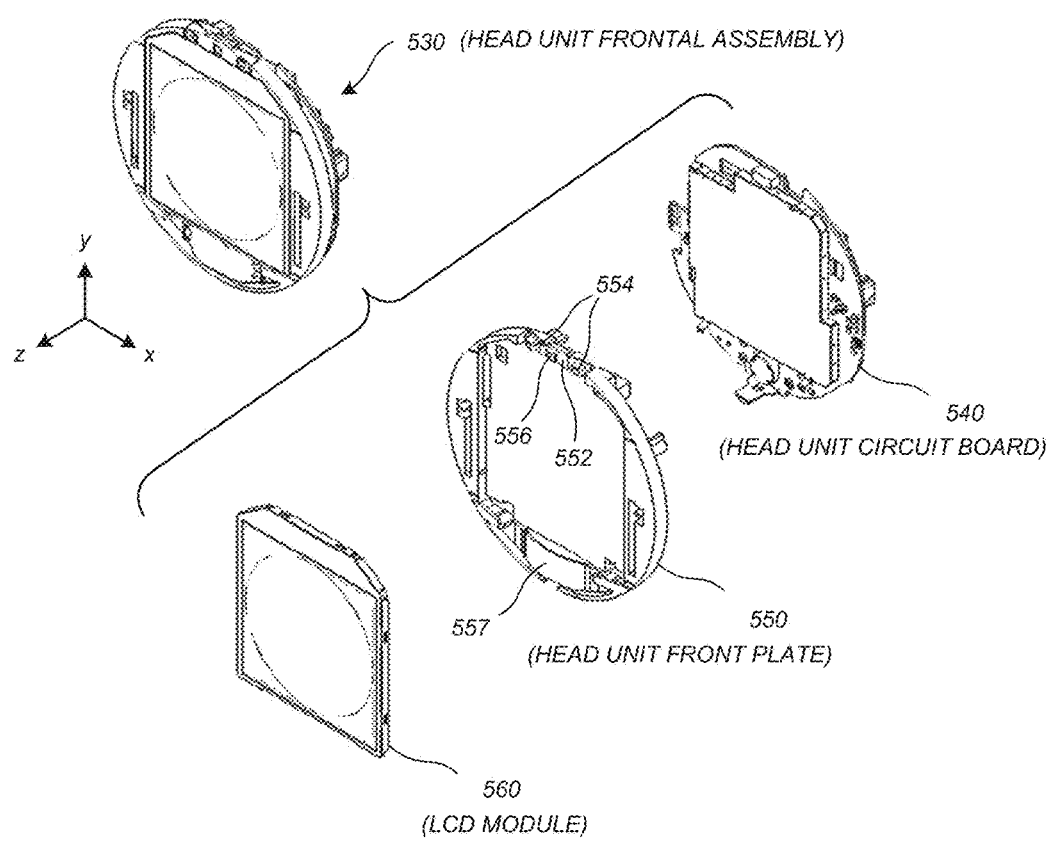
FIGS. 7A-7B illustrate exploded front and rear perspective views, respectively, of the head unit frontal assembly with respect to its primary components.
Figure 7B:
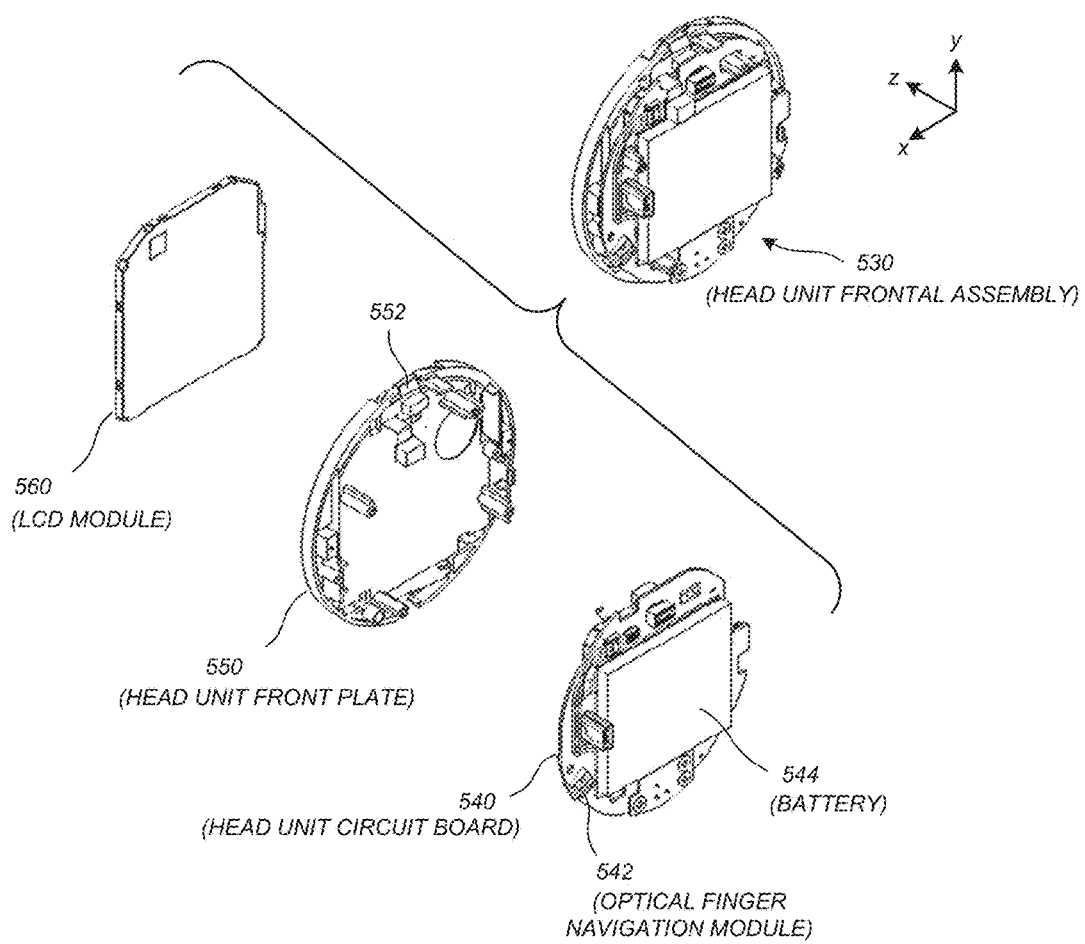

FIGS. 7A-7B illustrate exploded front and rear perspective views, respectively, of the head unit frontal assembly 530 with respect to its primary components. Head unit frontal assembly 530 comprises a head unit circuit board 540, a head unit front plate 550, and an LCD module 560. The components of the front side of head unit circuit board 540 are hidden behind an RF shield in FIG. 6A and are discussed in more detail in the incorporated applications. On the back of the head unit circuit board 540 is a rechargeable Lithium-Ion battery 544, which for one preferred embodiment has a nominal voltage of 3.7 volts and a nominal capacity of 560 mAh. To extend battery life, however, the battery 544 is normally not charged beyond 450 mAh by the thermostat battery charging circuitry. Moreover, although the battery 544 is rated to be capable of being charged to 4.2 volts, the thermostat battery charging circuitry normally does not charge it beyond 3.95 volts. Also visible in FIG. 6B is an optical finger navigation module 542 that is configured and positioned to sense rotation of the outer ring 520. The module 542 uses methods analogous to the operation of optical computer mice to sense the movement of a texturable surface on a facing periphery of the outer ring 520. Notably, the module 542 is one of the very few sensors that is controlled by the relatively power-intensive head unit microprocessor rather than the relatively low-power back plate microprocessor. This is achievable without excessive power drain implications because the head unit microprocessor will invariably be awake already when the user is manually turning the dial, so there is no excessive wake-up power drain anyway. Advantageously, very fast response can also be provided by the head unit microprocessor. Also visible in FIG. 7A is a Fresnel lens 557 that operates in conjunction with a PIR motion sensor disposes thereunderneath.

Figure 8A:
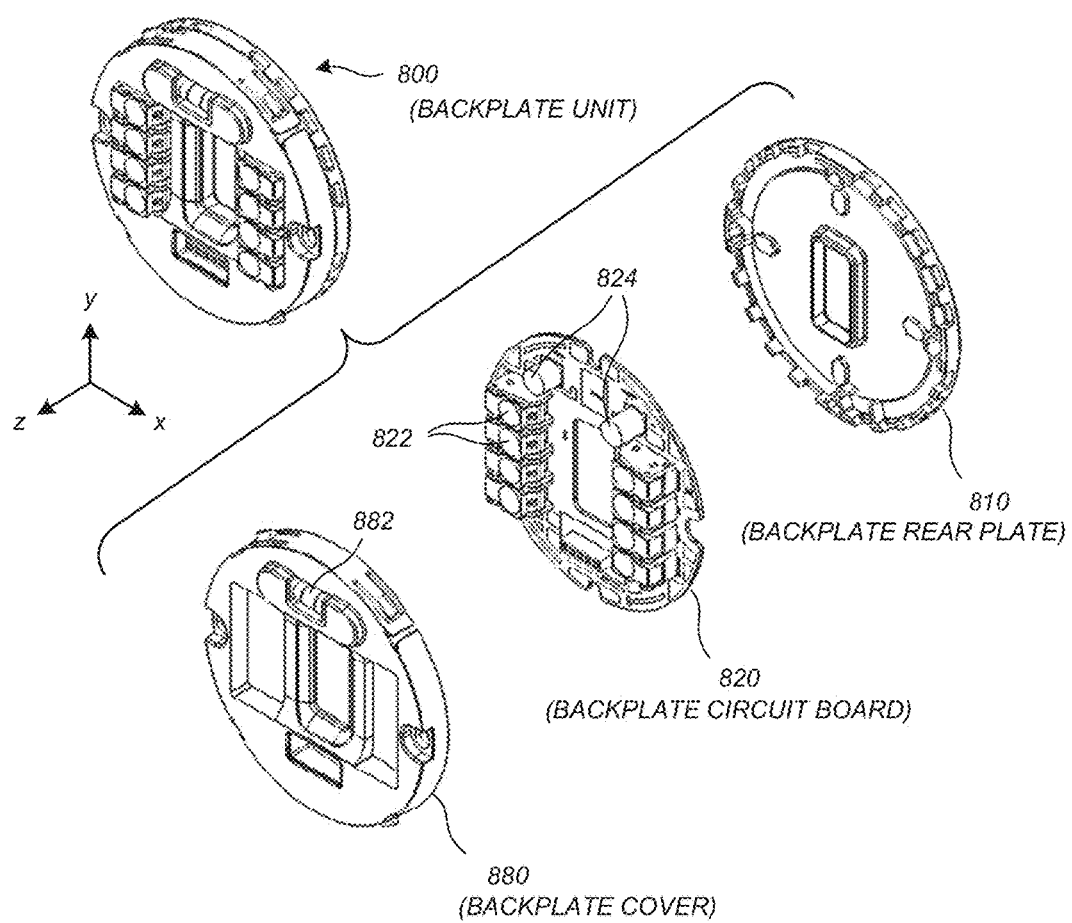
FIGS. 8A-8B illustrate exploded front and rear perspective views, respectively, of the back plate unit with respect to its primary components.
Figure 8B:
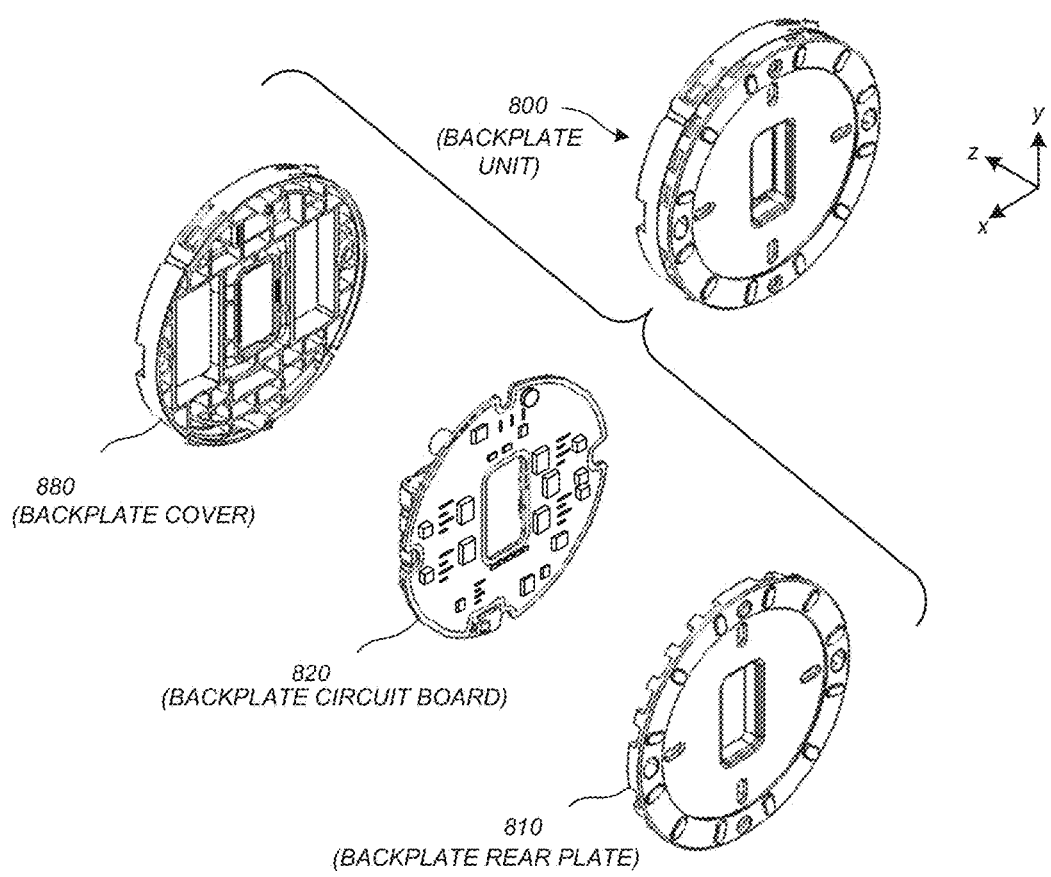

FIGS. 8A-8B illustrate exploded front and rear perspective views, respectively, of the back plate unit 800 with respect to its primary components. Back plate unit 800 comprises a back plate rear plate 810, a back plate circuit board 820, and a back plate cover 880. Visible in FIG. 8A are the HVAC wire connectors that include integrated wire insertion sensing circuitry, and two relatively large capacitors 824 that are used by part of the power stealing circuitry that is mounted on the back side of the back plate circuit board 820 and described in more detail in the incorporated applications.

Exemplary Motion Guide Assemblies

A motion guiding assembly, such as those described below, may be provided to control an inward motion of two components of the thermostat, such as the inward motion of outer ring 412 and/or cover 414 relative to a backplate or other component. The motion guiding assembly may provide the described tactile and/or audible "click" described herein. The motion guiding function may be provided by positioning one or more motion guiding members between a top disc-shaped member and a bottom disc-shaped member (also referred to herein as a top member and bottom member). The motion guiding member operationally couples the top disc-shaped member with the bottom disc-shaped member in a manner that allows the top disc-shaped member to be inwardly depressed by a user relative to the bottom disc-shaped member. A component of the top disc-shaped member, or a component coupled therewith, may contact and/or depress a switch. The switch may be electrically coupled with one or more electrical components of the thermostat, a thermostat control system, circuitry, programming, logic, and the like, as described herein and more fully described in the above incorporated applications. Depression of the switch may allow the thermostat to receive input from the user during the "inward click" operation and thereby allow the user to select on option of an interactive thermostat menuing system, such as setting or adjusting a temperature setpoint, navigating through an interactive menu, selecting a sub-menu, setting or adjusting a parameter of the thermostat control, setting or adjusting a date or time to perform a heating or cooling or other operation, and the like. The motion guiding member may contact the top disc-shaped member near the top disc-shaped member's outer periphery to control the inward motion of the top disc-shaped member relative to the bottom disc-shaped member.

The motion guiding assemblies described herein provide a more uniform tactile click sensation and/or audible click sound for the user, thereby improving the overall feel, quality, and/or control of the thermostat. For example, the tactile click sensation of current system controls, such as thermostats, may vary dramatically depending on where the user inwardly presses on the control. Depressing some areas of the control may provide a strong tactile sensation and/or sound while depressing other areas provides a weak and perhaps almost unnoticeable feel and/or sound. The resulting variation may confuse and/or mislead users because they are not be able to determine or easily determine if an input has been received by a corresponding control system. As a result, the user may become frustrated when interacting with the systems controls. Using the motion guiding assemblies described herein, tactile feedback to the user is improved by limiting the variation in the tactile click sensation and/or sound, resulting in improved feel and performance and less user frustration.

In one embodiment, the top disc-shaped member is inwardly depressable relative to the bottom disc-shaped member by up to about 2-3 mm, and more commonly up to about 1 mm. In another embodiment, the top disc-shaped member is inwardly depressable relative to the bottom disc-shaped member between about 0 mm and about 1 mm, and commonly about 0.5 mm. Similarly, in one embodiment, the rotation of an edge of the top disc-shaped member relative to the bottom disc-shaped member is limited to between about 0.5 mm and 3 mm, and more commonly about 1 mm. The total rotation of the top disc-shaped member relative to the bottom disc-shaped member may be limited to between the 0.5 mm and 3 mm, and more commonly 1 mm.

Figure 9A:
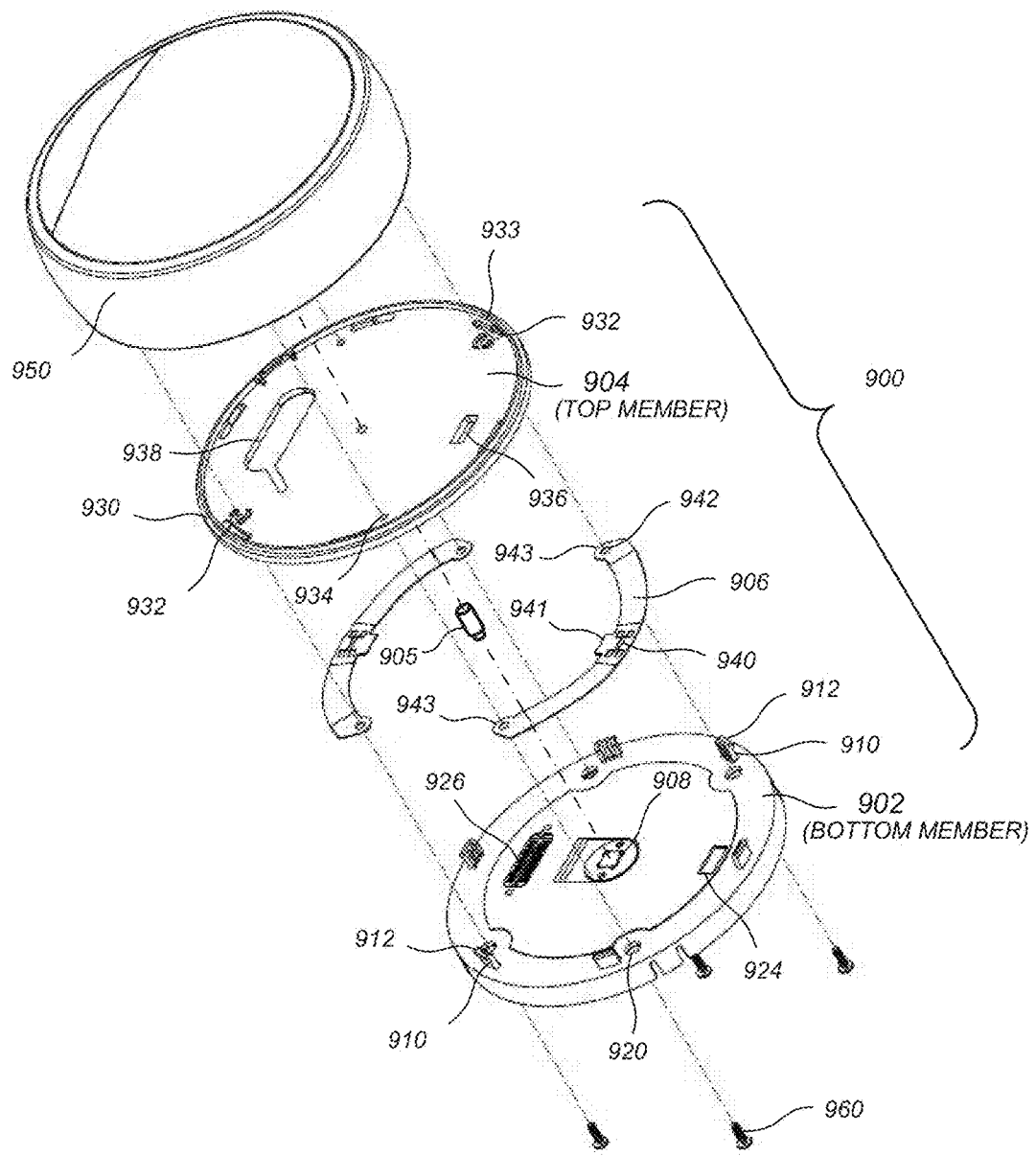
FIG. 9A illustrates an exploded perspective view of a motion guiding assembly that includes a plurality of stop members or studs.

FIG. 9A illustrates an exploded view of a motion guiding assembly 900 that is configured to control an inward motion of a top member 904 relative to a bottom member 902. Specifically, motion guiding assembly 900 controls a rotation or pivot of top member 904 relative to bottom member 902 as shown in FIG. 9E and more fully described below, which limits the variation in the tactile click sensation and/or sound. The rotation or pivot of top member 904 is controlled via a plurality of stop members or studs 910 that are positioned circumferentially around bottom member 902 and near the outer periphery of bottom member 902. Studs 910 extend axially outwardly from bottom member 902 and are configured to engage corresponding apertures 932 of top member 904 to create pivot points about which top member 904 rotates when top member 904 is inwardly pressed via an outer ring (not shown). In one embodiment, the studs 910 axially extend from bottom member 902 between about 5 mm and 15 mm, 5 mm and 10 mm, and more commonly about 8 mm. The apertures 932 may include a wide portion having dimensions between about 5 mm and 10 mm so as to allow the apertures to fit over the studs 910, and may also include a narrow portion (see lips 933) having dimensions between about 1 mm and about 6 mm, and more commonly between about 2 mm and 4 mm so as to allow the studs 910 to engage with the apertures.

To engage the apertures 932, studs 910 include flanges 912 that extend laterally from a main body of the stud and radially outwardly from bottom member 902. The flanges 912 may extend laterally from the main body of the studs 910 between about 2 mm and about 8 mm, and more commonly between about 3 mm and 6 mm, and may be positioned between about 4 mm and 6 mm from bottom member 902. The flanges 912 are positioned so as to overlie a lip 933 of the apertures 932 that extends centrally from an outer periphery of top member 904 (i.e., the narrow portions of the apertures). The flanges 912 contact the lips 933 as the top member 904 moves axially outwardly in relation to bottom member 902. Engagement of the flanges 912 with the apertures 932 limits and/or prevents the outward movement of the edge or top member 904 by creating a pivot point 913 near the outer periphery of top member 904 about which top member 904 rotates, as shown in FIG. 9E. Depressing top member 904 causes component 905 integrally formed or coupled with top member 904 to contact and/or depress switch 908 on the top surface of bottom member 902. Without engagement of flanges 912 and lips 933, the contact between component 905 and switch 908 would create a centrally located pivot point and cause outward axial movement of a peripheral edge of top member 904 opposite a peripheral edge being pressed by the user. Such a configuration would result in increased rotational movement of top member 904 relative to bottom member 902. This increased rotational movement would be noticeable to a user and would result in a dramatically varying tactile sensation and/or sound as the user pressed on the outer ring and/or thermostat cover 950 at different locations radially outward from switch 908. For example, pressing on outer cover 950 directly above switch 908 would cause a substantially planar motion while pressing on outer cover 950 at a peripheral edge would cause a substantially rotational motion.

Extending the pivot point 913 near the outer periphery of top member 904 provides a more planar inward motion of top member 904 relative to bottom member 902 even when outer cover 950 is pressed at or near a peripheral edge, thereby improving the tactile clicking sensation and/or sound. In one embodiment, studs 910 are positioned between about 0 mm and 10 mm from the peripheral edge of bottom member 902, and more commonly between about 2 mm and 6 mm from the peripheral edge. Further, although FIG. 9A shows six circumferentially equally spaced studs 910, other embodiments may include more or fewer studs than this. For example, in one embodiment four studs are used while in another embodiment eight or more studs are used.

In certain circumstances, two flanges 912 may engage with corresponding apertures 932 to create a quasi-pivot point located between the two flanges. For example, when a user presses on an area of cover 950 or the outer ring located between two flanges, the opposite edge of top member 904 may contact and press against two flanges. These two flanges may simultaneously operate as pivot points and thereby create a quasi-pivot point located between the two flanges. For this reason, it may be preferred to use six of more studs to ensure that the quasi-pivot point remains located as close to the peripheral edge as possible.

Referring back to FIG. 9A, the studs 910 are inserted through the apertures 932 so that the top member 904 is inwardly moveable about the studs 910. As described previously, the apertures 932 include a wide or enlarged portion that fits over the flanges 912 and thus allows the studs 910 to be inserted through the apertures 932. Once the studs 910 are inserted through the apertures 932, top member 904 may be rotated relative to bottom member 902 so that flanges 912 overlie a narrow portion (i.e., lips 933) and thereby limit outward axial movement of top member 904 as described above. To limit rotational movement of top member 904 relative to bottom member 902 once flanges 912 are positioned to overlie lips 933 (and thus ensure that the top and bottom members remain rotationally locked and coupled), a plurality of posts 960 may be inserted through corresponding apertures, 920 and 934, of the bottom and top members, 902 and 904 respectively. In one embodiment, the posts 960 may be between about 10 mm and 20 mm long, and more commonly about 15 mm, and may have a diameter of between about 2 mm and 6 mm, and more commonly about 4 mm. Posts 960 may be slidingly coupled with the bottom and/or top members, 902 and 904, to limit rotation movement of the members relative to one another while allowing outward and inward axial movement of the members. In one embodiment, posts 960 comprise screws or other mechanical fasteners that fasten with cover 950.

One or more resilient members, such as spring 906, may be positioned between top member 904 and bottom member 902 to bias the top and bottom members apart. Spring 906 may have an arcuate shape corresponding to the disc shape of the top and bottom members and may be positioned at or near the peripheral edge of the top and/or bottom members. Spring 906, or a plurality of springs, may press the flanges 912 and lips 933 into engagement and resiliently return the top and bottom members, 904 and 902, to a resting configuration after the clicking operation is performed. Spring 906 may have a central portion 941 disposed between two opposing ends 943 that are biased axially outward so that the central portion 941 contacts bottom member 902 and the two opposing ends 943 each contact top member 904, or vice versa. Central portion 941 may have an aperture 940 that allows spring 906 to be press fit over and about one of the studs 910 to lock the spring 906 about the stud 910. One or both opposing ends 942 may have an aperture 942 that slidingly receives a post 960.

Although FIG. 9A shows the motion guiding assembly 900 as including a pair of springs 906, it should be realized that more or fewer springs could be used. For example, in one embodiment a single circular spring (e.g., a Belleville or wave spring washer) is used, while in other embodiments three or more springs are used. In one embodiment, each stud 910 is fitted with a spring.

Top member 904 may also include a smooth lip or edge 930 upon which the described outer ring is slidingly rotated. The dimensions of edge 930 may closely correspond to the dimensions of the outer ring so that the sliding motion of the outer ring is smooth and pleasant to a user. Edge 930 may receive an inward pressing force from the outer ring as the outer ring and/or cover 950 is inwardly pressed, which causes top member 904 to move axially inward as described herein. Top member 904 may also include one or more radially inwardly located apertures, 936 and 938, through which various electrical or other components, wires, and the like are inserted. For example, a ribbon or other cable may be inserted through aperture 938 and connected to an electrical port 926 of bottom member 902. Bottom member 902 may also have one or more apertures 924 through which various electrical or other components, wires, and the like are inserted. Aperture 924 may be aligned with aperture 936 of top member 904. FIG. 9A also shows the centrally located switch, which may be a dome switch as described herein and may provide a tactile clicking sound when the switch 908 is depressed. Switch 908 may resiliently return to an undepressed state after the clicking operation is performed and, in some embodiments, may also bias the top and bottom members apart.

In one embodiment, top member 904 may be a circular disc have a diameter of between about 60 mm and 100 mm, 70 mm and 90 mm, and more commonly about 80 mm. Top member 904 may also have a disc thickness of between about 2 mm and 10 mm, and more commonly between about 3 mm and 6 mm. Bottom member 902 may likewise be a circular disc having approximately the same or similar disc dimensions. In one embodiment, top member 904 may be axially separated from bottom member 902 in an assembled configuration between about 2 mm and 15 mm, and more commonly between about 2 mm and 10 mm. Component 905 may axially inward from top member 904 between about 2 mm and about 14 mm, and more commonly between about 2 mm and about 9 mm so that component 905 is positioned directly above switch 908 and above the top surface of bottom member 902 by about 1 mm. In one embodiment, the material for bottom member 902 and/or top member 904 is a high-strength, high-rigidity plastic material such as IXEF 1022-PAA-GF50, a 50% glass-fiber reinforced general purpose polyacrylamide plastic available from Solvay Specialty Polymers. The other top and/or bottom members described herein may be made of the same material and/or have the same or similar disc dimensions, spacing dimensions, spacing configurations, component configurations, and the like.

Figure 9B:
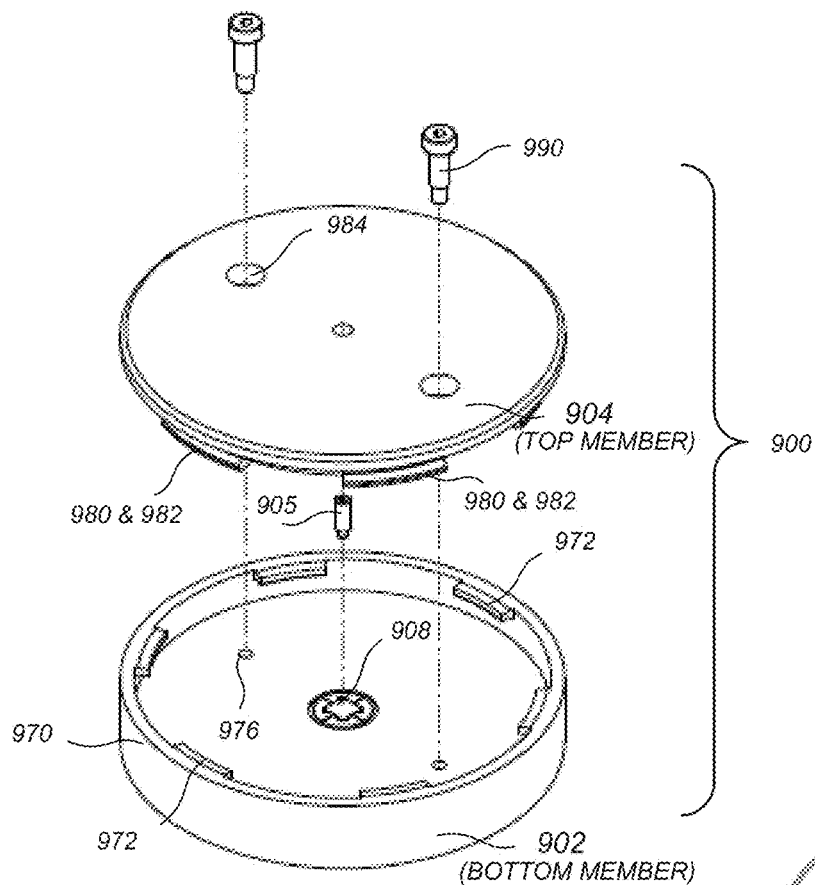
FIGS. 9B-D illustrate an exploded perspective view and assembled views of an alternative embodiment of a motion guiding assembly that includes a plurality of stop members or studs.

FIG. 9B illustrates an exploded view of an alternative embodiment of motion guiding assembly 900 that is configured to control a rotation or pivot of top member 904 relative to a bottom member 902. As in the embodiment of FIG. 9A, the rotation or pivot of top member 904 is controlled by creating a pivot point 913 (see FIG. 9F) at or near an outer edge of the motion guiding assembly 900. The pivot point 913 is created by the engagement of flanges 972 of bottom member 902 with corresponding flanges 982 of top member 904. Specifically, bottom member 902 includes a wall or ring 970 that extends axially outward from a main body of bottom member 902 and that extends entirely, or partially, around the outer periphery of bottom member 902. Although wall 970 is shown being positioned at the outer edge of bottom member 902, in some embodiments, wall 970 is positioned slightly radially inward from the outer edge. Flanges 972 extend from wall 970 radially inward. FIG. 9B illustrates six flanges 972 positioned and equally spaced circumferentially around wall 970, although more or fewer flanges may be used.

Top member 904 includes studs 980 that extend axially inward from a bottom surface of top member 904. Each of the studs 980 includes a flange that extends radially outward from the stud body. The studs 980 and flanges 982 are configured so that the bottom member 902's flanges 972 may positioned axially above the top member 904's flanges 982 without engaging the studs 980. As the top member 904 moves axially outward, such as when component 905 contacts switch 908 and creates a centrally located pivot point, a bottom surface of one or more of flanges 972 contacts a top surface of a corresponding flange 982 to create pivot point 913, about which top member 902 rotates, thereby providing a more planar inward motion of top member 904 relative to bottom member 902 and improving the tactile clicking sensation and/or sound.

Figure 9C:
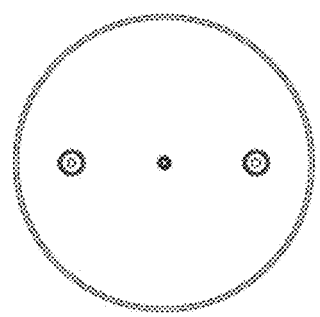
Figure 9D:
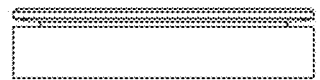
Figure 9E:
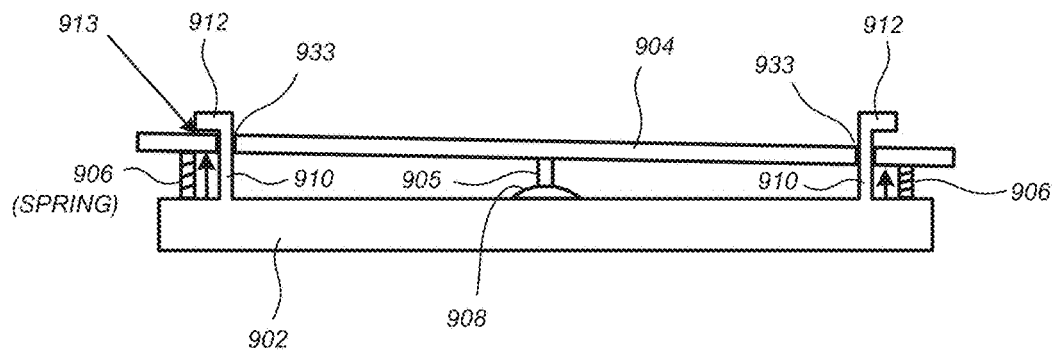
FIGS. 9E & 9F illustrate side views of the operation of the motion guiding assemblies of FIGS. 9A & 9B.
Figure 9F:
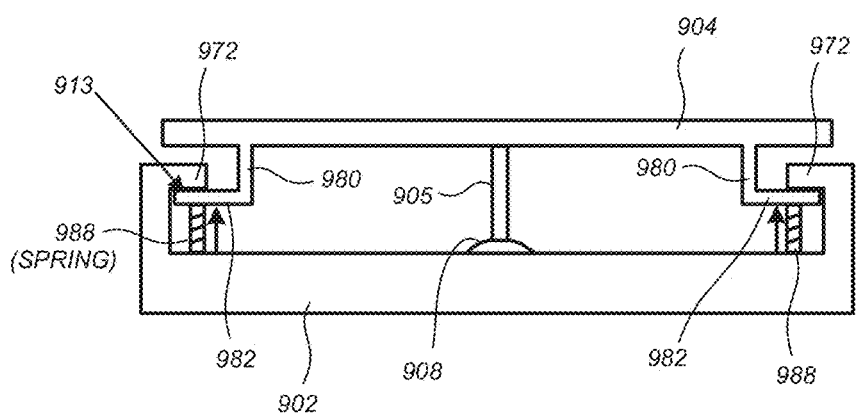

As in FIG. 9A, one or more springs 988 (see FIG. 9F) may be positioned between top member 904 and bottom member 902 to bias the two members apart. In one embodiment, spring 988 comprises a single circular spring where a main body contacts bottom member 902 and several studs extend axially outwardly to contact top member 904 and bias the two members apart. In other embodiments, spring 988 includes a Belleville or wave spring washer or includes multiple spring components. Assembly 900 of FIG. 9B may also include one or more posts 990 that are inserted through corresponding apertures, 984 and 976, of the top and bottom members, 904 and 902 respectively. Posts 990 may limit rotational movement of the top member 904 relative to the bottom member 902. Further, the top and/or bottom members, 904 and 902, may be axially movable about posts 990 or may be coupled therewith. FIG. 9C illustrates a top view of an assembled assembly 900 while FIG. 9D illustrates a side view of the assembled assembly 900.

In an alternative embodiment, the bottom member 902 includes a single flange that extends radially inward from wall 970. The single flange may extend from the entire perimeter of the wall to form an inward facing lip. Similarly, top member 904 may include a wall instead of the studs 980 and a single outward facing flange that extends from the entire perimeter of the top member 904's wall to form an outward facing lip. The bottom member 902's inward facing lip may be disposed axially above the top member 904's outward facing lip to restrict outward axial movement of the top member 904 and essentially create an infinite number of pivot points.

Figure 10A:
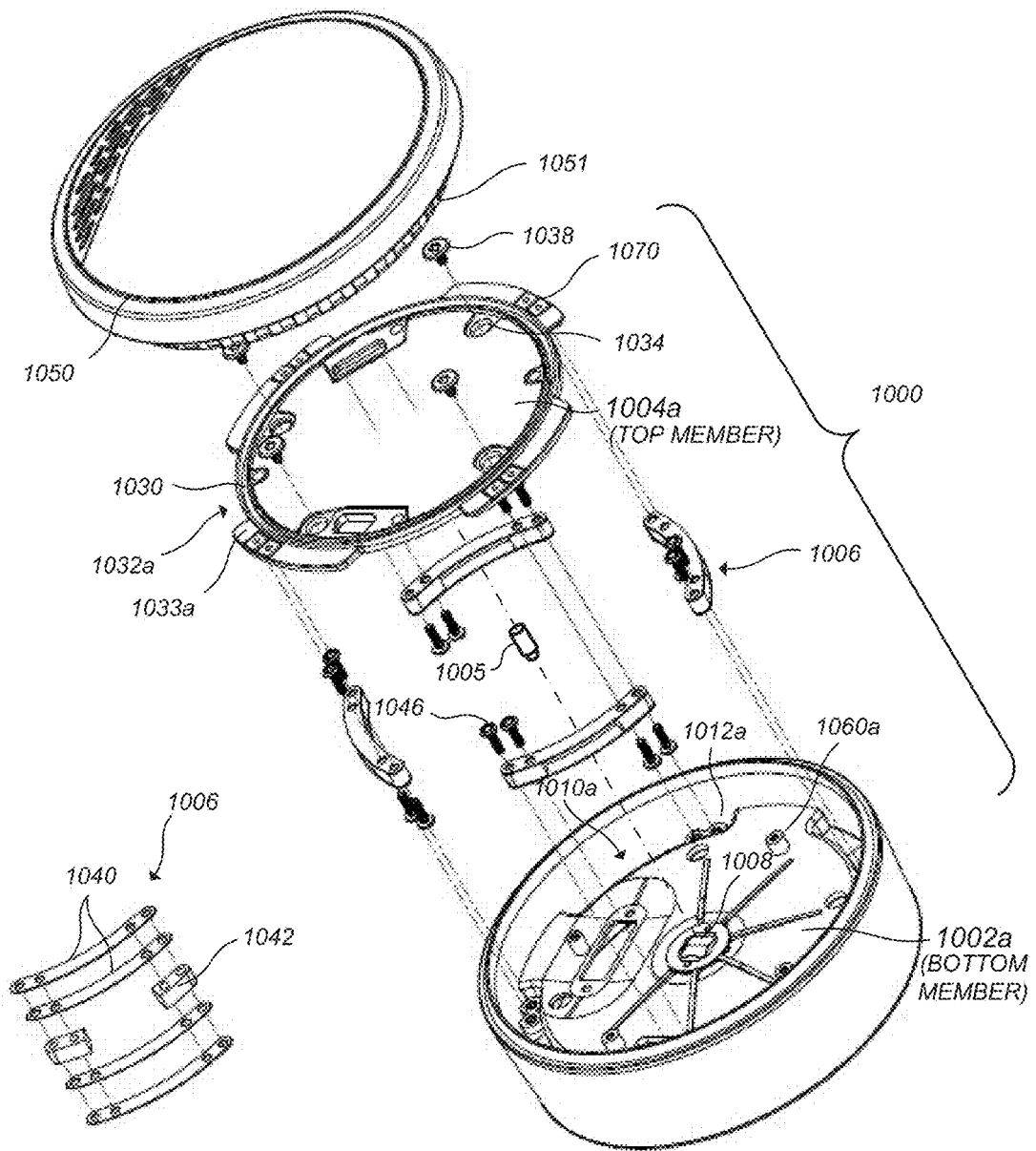
FIG. 10A illustrates an exploded perspective view of a motion guiding assembly that includes a plurality of compliant mechanisms.

FIG. 10A illustrates an exploded view of a motion guiding assembly 1000 that is configured to control an inward motion of a top member 1004a relative to a bottom member 1002a. Like assembly 900, assembly 1000 controls a rotation or pivot of top member 1004a relative to bottom member 1002a and provides a more planar relative motion between the two members. The relative motion of the two members is controlled via a plurality of compliant mechanisms 1006 that are positioned circumferentially and equally spaced around assembly 1000. The compliant mechanisms 1006 are rigidly coupled with top member 1004a and bottom member 1002a via fasteners 1046 (e.g., screws) near the outer periphery or edge of the two members. The compliant mechanisms 1006 have a flexible middle portion that deflects and thereby allows the top member 1004a to be pressed axially inwardly relative to bottom member 1002a.

As shown in greater detail in the exploded view of the compliant mechanism 1006, each compliant mechanism 1006 includes a plurality of longitudinally extending members 1040 and two end members 1042. The end members 1042 are disposed between top and bottom pairs of the longitudinally extending members 1040 and coupled therewith on opposing ends. In other embodiments, the end members 1042 are coupled with a single top and bottom longitudinally extending member 1040. The longitudinally extending members 1040 are made of a flexible and resilient material so that each longitudinally extending member 1040 functions as a spring. End members 1042 laterally separate the top and bottom pairs of longitudinally extending members 1040 thereby allowing the central portion of the longitudinally extending members 1040 and compliant mechanism 1006 to be axially deflected when the outer ring and/or cover 1050, and thus, top member 1004a, is inwardly pressed by a user. This configuration provides and controls the inward motion of top member 1004a relative to bottom member 1004b. Further, although the longitudinally extending members 1040 are flexible in an axial direction, the longitudinally extending members 1040 may be relatively rigid in a radial direction to prevent radial movement and/or rotation of the top and bottom members, 1004a and 1002a, relative to one another.

Longitudinally extending members 1040 may be configured to bias the top and bottom members, 1004a and 1002a, apart in a resting state. Thus, the longitudinally extending members 1040 and compliant mechanism 1006 may resiliently return top member 1004a to a position axially spaced apart from bottom member 1002a after an inward clicking operation is performed. The longitudinally extending members 1040 may have an arcuate configuration that matches a curve of the outer periphery of the top and bottom members and may have a longitudinal length of between about 20 mm and 40 mm, 25 mm and 35 mm, and more commonly about 30 mm. Each longitudinally extending member 1040 may also have a width of between about 2 mm and 6 mm, and more commonly about 3 mm, and a thickness of up to 1 mm, although the thickness is typically less than 0.5 mm to provide increased flexibility. The end members 1042 may have a longitudinal length of between about 4 mm and 10 mm, and more commonly between about 8 mm, and may have a width and arcuate configuration that approximately matches the longitudinally extending members 1040. The end members 1042 may have a thickness of between about 2 mm and 6 mm, and more commonly about 4 mm, so that the longitudinally extending members 1040 are laterally separated by this amount as are the top and bottom members, 1004a and 1002a.

Top member 1004a is a relatively thin disc-shaped component and each compliant mechanism 1006 is mechanically fastened to a corresponding flange 1033a of the top member 1004a via fasteners 1046. In alternative embodiments, the compliant mechanisms 1006 may be adhesively bonded to the corresponding flanges 1033a. The flanges 1033a are circumferentially arranged and equally spaced around the outer periphery of top member 1004a. A gap 1032a exists between adjacent flanges 1033a. The compliant mechanisms 1006 are coupled with the flanges so that the central portion of each mechanism is positioned within a gap 1032a. This allows the compliant mechanisms 1006 to flex and deflect without interference from the top member 1004a. For example, this configuration allow the central portion and opposing end of the compliant mechanism 1006 that is not coupled with the top member 1004a to flex axially outward beyond a bottom surface of the top member 1004a. The embodiment shown includes four compliant mechanisms 1006 being used, although the use of more or fewer compliant mechanisms is possible.

The end member 1042 is preferably coupled via two fasteners 1046 to the flange 1033a of top member 1004a to reinforce the coupling and prevent the end member 1042 from rotating relative to the top member 1004a. Attachment via two fasteners 1046 also helps provide a more planar inward motion of top member 1004a relative to bottom member 1002a. Mechanically fastening of the end member 1042 with the flange 1033a may be reinforced using reinforcement members 1070. Top member 1004a may also include an edge or track 1030 upon or within which outer ring 1051 rotationally slides. FIG. 10A shows outer ring 1051 coupled with cover 1050.

Bottom member 1002a is a thicker disc-shaped component and an opposing end of each compliant mechanism 1006 is mechanically fastened thereto so that each end of the compliant mechanism is coupled with either the top member 1004a or the bottom member 1002a. The compliant mechanism 1006 is mechanically fastened via fasteners 1046 to apertures 1012a of the bottom member 1002a. In alternative embodiments, the compliant mechanisms 1006 may be adhesively bonded to the bottom member 1002a. The bottom member 1002a includes recessed portions 1010a circumferentially arranged and equally spaced around the outer periphery of bottom member 1002a. The compliant mechanisms 1006 are coupled with the bottom member 1002a so that the central portion of each mechanism is positioned within the recessed portions 1010a. This allows the compliant mechanisms 1006 to flex and deflect axially inward without interference from the bottom member 1002a. For example, this configuration allow the central portion and the end of the compliant mechanism 1006 coupled with the top member 1004a to flex axially inward beyond a top surface of the bottom member 1002a.

Similar to the top member 1004a, the end member 1042 is preferably coupled via two fasteners 1046 to the bottom member 1002a to reinforce the coupling and prevent the end member 1042 from rotating relative to the bottom member 1002a. Attachment via two fasteners 1046 also helps provide a more planar inward motion of top member 1004a relative to bottom member 1002a. Although not shown, mechanically fastening of the end member 1042 with the bottom member 1002a may be reinforced using reinforcement members 1070.

Centrally positioned on the top surface of bottom member 1002a is switch 1008, which as described herein may be domed shaped, resilient, and/or electrically coupled with various controls, systems, circuitry, and the like. Switch 1008 may be contacted and/or pressed by a component (not shown) integrally formed or coupled with top member 1004a so that input from a user is received and an option of an interactive menuing system is selected.

To further prevent rotational relative motion of the top and bottom members, 1004a and 1002a, a post 1060a or a plurality of posts of bottom member 1002a may be slidingly inserted within corresponding apertures 1034 of top member 1004a. One or more mechanical fasteners, such as screw 1038, may axially couple top member 1004a with the posts 1060a.

FIG. 10B illustrates an exploded view of another embodiment of motion guiding assembly 1000 that is configured to control an inward motion of a top member 1004a relative to a bottom member 1002a. Assembly 1000 of FIG. 10B is similar to the assembly 1000 of FIG. 10A varying mainly in the configuration of the top and bottom members. Assembly 1000 of FIG. 10B includes the compliant mechanisms 1006 rigidly coupled with top member 1004b and bottom member 1002b via fasteners 1046 (e.g., screws) near the outer periphery or edge of the two members. As previously described, the compliant mechanisms 1006 have a flexible middle portion that deflects and thereby allows the top member 1004b to be pressed axially inwardly relative to bottom member 1002b.

Top member 1004b is a thicker disc-shaped component compared with top member 1004a. Each compliant mechanism 1006 is mechanically fastened to a thin lip 1035 of top member 1004b via fasteners 1046. Specifically, the fasteners 1046 are inserted through apertures of the thin lip 1035 and threaded into reinforcement members 1070 positioned above the apertures. In an alternative embodiment, the compliant mechanisms 1006 may be adhesively bonded to the thin lip 1035. The lips 1035 are circumferentially arranged and equally spaced around the outer periphery of top member 1004b. Positioned directly adjacent and to one side of each lip 1035 is a sloped protrusion 1033b. The sloped protrusion 1033b reinforces one side of the thin lip 1035 to ensure that the lip does not break or crack during inward axial deflection of the compliant mechanism 1006. Positioned directly adjacent and to an opposite side of the sloped protrusion 1033b is a gap 1032b. The compliant mechanisms 1006 are coupled with the lips 1035 so that the central portion of each mechanism is positioned axially below the slope of the sloped protrusion 1033b, and so that the end of the compliant mechanism 1006 that is not coupled with the top member 1004b is positioned axially below the gap 1032b. In this manner the compliant mechanisms 1006 may flex and deflect axially outwardly beyond a bottom surface of the top member 1004b without interference from the top member 1004b, such as, for example, without interference from the sloped protrusion 1033b.

Similar to assembly 1000 of FIG. 10A, the compliant mechanism 1006's end member 1042 is preferably coupled via two fasteners 1046 to the lip 1035 of top member 1004b to reinforce the coupling and prevent the end member 1042 from rotating relative to the top member 1004b. This attachment also helps ensure a more planar inward motion of top member 1004b relative to bottom member 1002b.

Bottom member 1002b is also a relatively thick disc-shaped component and like top member 1004b, each compliant mechanism 1006 is mechanically fastened to a thin lip 1011 of bottom member 1002b via fasteners 1046. The fasteners 1046 are inserted through apertures of the thin lip 1011 and threaded into reinforcement members 1070 positioned axially below the apertures. The compliant mechanisms 1006 may likewise be adhesively bonded to the thin lip 1011. The lips 1011 are circumferentially arranged and equally spaced around the outer periphery of bottom member 1002b and positioned directly adjacent and to one side of each lip 1011 is a sloped protrusion 1012b. Sloped protrusion 1012b reinforces one side of the thin lip 1011 to ensure that the lip does not break or crack during inward axial deflection of the compliant mechanism 1006. Positioned directly adjacent, and to an opposite side of the sloped protrusion 1012b, is a gap 1010b. The compliant mechanisms 1006 are coupled with the lips 1011 so that the central portion of each mechanism is positioned axially above the slope of the sloped protrusion 1012b and so that the end of the compliant mechanism 1006 that is not coupled with the bottom member 1002b is positioned axially above gap 1010*b*. In this manner, the compliant mechanisms 1006 may flex and deflect axially inwardly beyond a top surface of bottom member 1002*b* without interference from the bottom member 1002*b*, such as, for example, without interference from the sloped protrusion 1012*b*.

Each compliant mechanism 1006's end members 1042 are preferably coupled via two fasteners 1046 to the lip 1011 of bottom member 1002*b* to reinforce the coupling and prevent the end member 1042 from rotating relative to the bottom member 1002*b*. This attachment also helps ensure a more planar inward motion of top member 1004*b* relative to bottom member 1002*b*.

Centrally positioned on the top surface of bottom member 1002*b* is switch 1008, which as described above may be contacted and/or pressed by a component 1005 integrally formed or coupled with top member 1004*b*. To prevent rotational relative motion of the top and bottom members, 1004*b* and 1002*b*, a post 1060*b* or a plurality of posts, may be inserted through corresponding apertures 1062 of top member 1004*b*, and mechanically coupled with corresponding apertures 1064 of bottom member 1002*b*. Top member 1004*b* may axially slide about the posts 1060*b*. The posts 1060*b* may be screws or any other type of mechanical fastener. FIG. 10C illustrates a top view of an assembled assembly 1000, while FIG. 10D illustrates a side view of the assembled assembly 1000.

The above described assemblies 1000 provide a substantially planar inward motion of the top member relative to the bottom member, thus improving the tactile clicking sensation and/or sound and the overall operational feel and experience of a thermostat control.

FIG. 11A illustrates an exploded view of a motion guiding assembly 1100 that is configured to control an inward motion of a top member 1104 relative to a bottom member 1102. Similar to the previous assemblies, assembly 1100 controls a rotation or pivot of top member 1104 relative to bottom member 1102 to provide a more planar relative motion between the two members. The relative motion of the two members is controlled via two or more crisscrossing torsion bars or springs 1106 that function similar to sway bars to limit rotation of an edge of the top member 1104 relative to an opposite edge of the top member. Torsion bars 1106 provide substantially planar inward motion of the top member relative to the bottom member.

Each of the torsion bars 1106 includes a straight middle portion 1120 and upturned opposing ends 1122. Extending from each of the opposing ends 1122 roughly parallel to middle portion 120 is a short end rod or portion 1124. One of the torsion bars 1106 may include an arch 1126 in the middle portion 1120 that allows the torsion bars 1106 to crisscross without interference. The torsion bars 1106 are inserted between top member 1104 and bottom member 1102 so that the middle portion 1120 of the torsion bar 1106 contacts the bottom member 1102, and the short end rods 1124 contact the top member 1104, or vice versa. The short end rods 1124 typically contact the top member 1104 near the top member's outer edge or periphery. This helps reduce the rotational movement of opposing sides of the top member 1104.

Bottom member 1102 includes hook couplings 1110 that secure the middle portion 1120 of the torsion bars 1106 relative to the bottom member 1102. The hook couplings 1110 are open on one end so that the torsion bars 1106 may be inserted within the hook couplings 1110 and/or slide on the top surface of bottom member 1102. The top member 1104 includes similar hook couplings (see 1130 of FIG. 11C) that perform similar functions.

As shown in FIG. 11C, the torsion bars are inserted between the top member 1104 and bottom member 1102 so that the upturned opposing ends 1122 form an angle with the top and bottom members, 1104 and 1102. In this configuration, when an edge of the top member 1104 is pressed axially inward, the force is transferred to middle portion 1120 via an opposing end 1122 and the middle portion 1120 is torqued. This torquing causes an axially inward force to be applied to an opposite end of the top member via the opposite end 1122 of the torsion bar 1106 and the hook coupling 1130 causing the opposite end to be moved axially inward. In other words, the axially inward force applied to one side of the top member 1104 is transferred via the torsion bar 1106 to the opposite side so that rotation of the top member 1104 is reduced and both ends move axially inward. When a force is applied between a pair of torsion bars 1106 some of the force will torque each of the torsion bars 1106 and be transferred to the opposite ends of the torsion bars. In this manner both torsion bars may be used to reduce rotation and provide substantially planar motion.

The torsion bars 1106 generally crisscross at roughly orthogonal angles or crisscross so that the angle between each torsion bar is roughly equal if more than two torsion bars are used. This ensures a more uniform tactile click sensation and/or sound. Further, the torsion bars 1106 may be positioned so that an angle between the bottom member 1102 and each upturned end 1122 is roughly 90 degrees different. In this manner, rotation of the top member 1104 relative to the bottom member 1102 is limited. The torsion bars 1106 may also crisscross at a location radially away from the central portion of bottom member 1102 to allow component 1105*a* to contact and press against switch 1108*a*.

Another feature which is shown in FIG. 11A and that may be included in the previously described assemblies, is the use of multiple switches. Bottom member 1102 includes the centrally located switch 1108*a* and other switches 1108*b* spaced radially away from the center of bottom member 1102. The top member 1104 may include or be coupled with multiple components 1105*b* that are disposed axially above each of the other switches 1108*b* and that are configured to contact and/or press against the other switches 1108*b*. The other switches 1108*b* may be equally spaced and oriented on the top surface of bottom member 1102 or include a random configuration. The other switches may be each coupled with the thermostat controls, systems, and the like, similar to central switch 1108*a* to receive the user's input and may improve the tactile feel of the thermostat by reducing the need for the central switch 1108*a* to be pressed. The torsion bar 1106 may have a longitudinal length, measured from the ends of opposing end rods 1124, of between about 55 mm and 95 mm, 65 mm and 85 mm, and more commonly about 75 mm. The torsion bar 1106's longitudinal length may be such that when assembled with the top and bottom members, 1104 and 1102, each of the end rods 1124 is between about 1 mm and 10 mm from a peripheral edge of the top member 1104, and more commonly between about 2 mm and 6 mm. In this manner, the torsion bar 1106 may contact the top member 1104 near the peripheral edge. The torsion bar 1106 may also have a diameter of between about 1 mm and 3 mm, and more commonly about 1.5 mm. The opposing ends 1122 may extend from the straight portion 1120 by between about 5 mm and about 15 mm, and more commonly between about 10 mm and 12 mm. Similarly, end rods 1124 may extend from the opposing ends 1122 by between about 3 mm and 8 mm, and more commonly about 6 mm.

Similar to the other assemblies, to prevent rotational relative movement of the top and bottom members, 1104 and 1102, a post 1160, or a plurality of posts, may be slidingly inserted within corresponding apertures, 1134 and 1116, of the top and bottom members, 1104 and 1102 respectively. Post 1160 may be a mechanical fastener, such as a screw, that couples with aperture 1116 of bottom member 1102. In addition, although not shown, assembly 1100 may include one or more springs positioned between the top member 1104 and bottom member 1102. In one embodiment, the spring is concentrically positioned around the component 1105a while in another embodiment, the spring, or a plurality of springs, are positioned near the outer periphery or edge of the assembly as previously described. FIG. 11B illustrates a top view of an assembled assembly 1100 while FIG. 11C illustrates a side view of the assembled assembly 1100.

FIG. 12A illustrates an exploded view of a motion guiding assembly 1200 that is configured to control an inward motion of a top member 1204 relative to a bottom member 1202. Assembly 1200 provides a substantially planar relative motion between the two members via scissor mechanism 1206. Scissor mechanism 1206 includes a pair of overlapping crisscrossing members 1220 and 1222 that are rotationally coupled at the crisscross locations 1224. The scissor mechanism 1206 may extend and retract in the axial direction to provide the planar relative motion of top member 1204 and bottom member 1202. Opposing sides of the crisscrossing members, 1220 and 1222, may have an arcuate shape that matches the arcuate shape of the top and bottom members, 1204 and 1202, (e.g., arcuate shapes corresponding to a disc diameter of between about 60 mm and 100 mm, 70 mm and 90 mm, and more commonly about 80 mm). The arcuate opposing sides may have an arc length of between about 55 mm and 75 mm, and more commonly about 65 mm. Members, 1220 and 1222, may be between about 2 mm and 100 mm wide, and more commonly about 6 mm, and may have a thickness of between about 1 mm and 3 mm, and more commonly about 2 mm. Scissor mechanism 1206 may be sized slightly smaller than the top and bottom members, 1204 and 1202, so that the mechanism may be inserted between the members and contact the members near or at the outer periphery without extending radially beyond the outer periphery. Scissor mechanism 1206 may separate the top and bottom members, 1204 and 1202, by between about 6 mm and 14 mm, and more commonly about 10 mm.

A central portion 1226 of each member between these opposing sides may be straight and may have a longitudinal length of between about 40 mm and 60 mm, and more commonly about 50 mm. One or more portions 1227 of an inner facing surface of each of the central portions 1226 may be flat to allow the central portions 1227 to be easily inserted within hook couplings 1212 and 1232 of the bottom and top members, 1202 and 1204 respectively. The central portions 1227 may slide within the hook couplings, 1212 and 1232, and on the surface of the respective top or bottom member to allow the scissor mechanism to axially extend and retract. End portions 1228 on an opposite side of the central portion 1227 may be rotationally coupled with couplings 1210 of the top and bottom members, 1204 and 1202 (the top coupling is not shown). The end portions 1228 and couplings 1210 may be coupled via posts, pins, screws, clips, and the like. Typically, the end portions 1228 and central portions 1226 are the only portions of the scissor mechanism that contact the top and bottom members, 1204 and 1202, as the scissor mechanism 1206 axially extends and retracts.

Similar to assembly 1100, bottom member 1202 includes a centrally located switch 1208a and other switches 1208b spaced radially away from the center of bottom member 1202. The top member 1204 includes or is coupled with multiple components (not shown) that are disposed axially above each of the other switches 1208b and that are configured to contact and/or press against the other switches 1208b. The other switches 1208b may be equally spaced and oriented on the top surface of bottom member 1202 or include a random configuration as shown in FIG. 12B. The other switches 1208b may each be coupled with the thermostat controls, systems, and the like similar to central switch 1208a to receive the user's input. The switches 1208b may improve the tactile feel of the thermostat by reducing the need for the central switch 1208a to be pressed by component 1205.

Similar to the other assemblies, to prevent rotational relative movement of the top and bottom members, 1204 and 1202, a post 1260, or a plurality of posts, may be slidingly inserted within corresponding apertures, 1230 and 1216, of the top and bottom members, 1204 and 1202 respectively. Post 1260 may be a mechanical fastener, such as a screw, that couples with aperture 1216 of bottom member 1202. In addition, although not shown, assembly 1200 may include one or more springs positioned between the top member 1204 and bottom member 1202. In one embodiment, the spring is concentrically positioned around the component 1205 while in another embodiment, the spring, or a plurality of springs, are positioned near the outer periphery or edge of the assembly as previously described. FIG. 12B illustrates a top view of an assembled assembly 1200, while FIG. 12C illustrates a side view of the assembled assembly 1200.

Exemplary Methods

Figure 13:
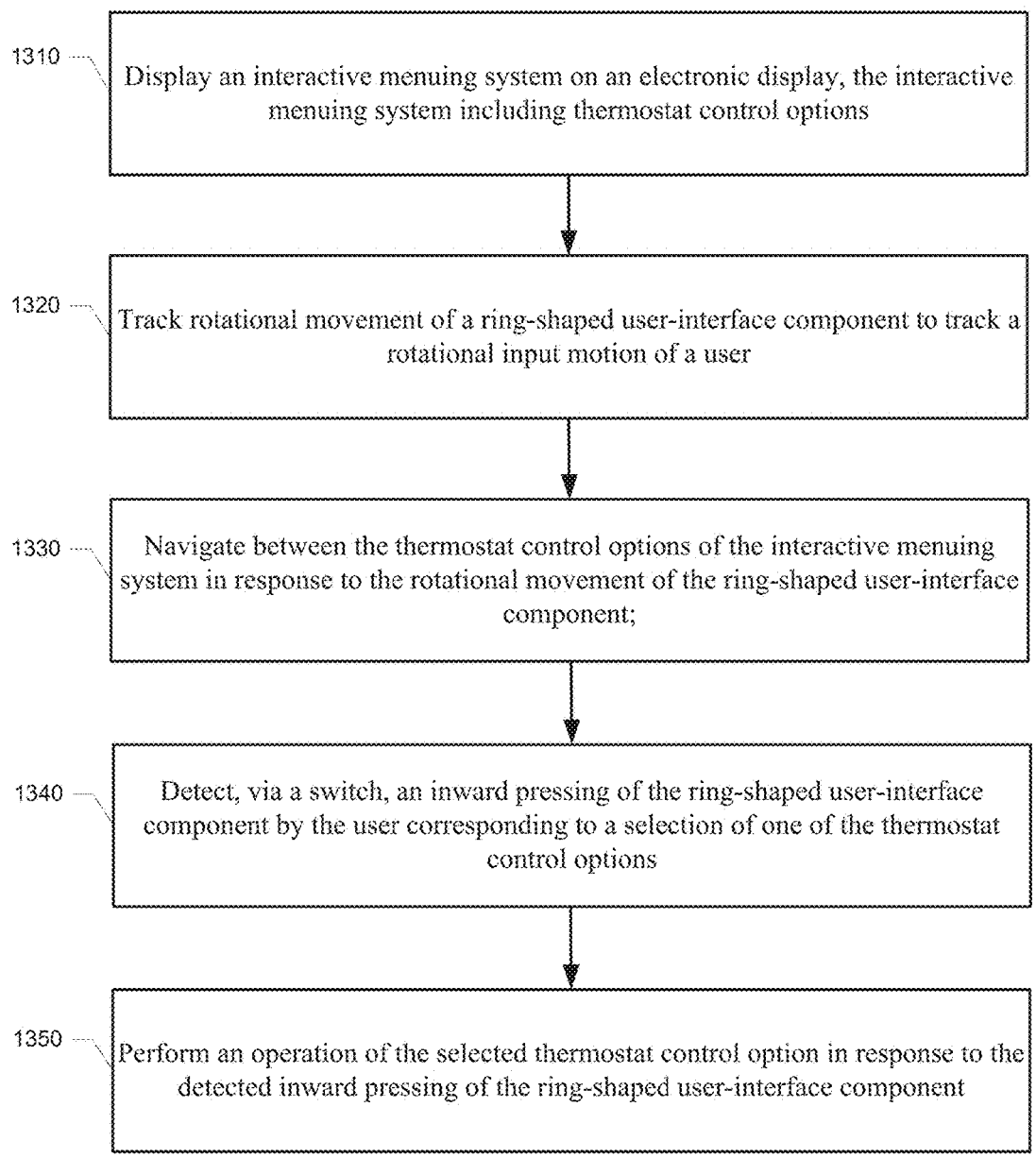
FIG. 13 illustrates a method for control of an HVAC system by a thermostat.

FIG. 13 illustrates a method for control of an HVAC system by a thermostat. As described herein, the thermostat may include a top member, a bottom member, a switch, a ring-shaped user-interface component, an electronic display, and an interactive menuing system. At block 1310, the interactive menuing system is displayed on the electronic display. The interactive menuing system may include one or more thermostat control options. At block 1320, rotational movement of the ring-shaped user-interface component is tracked so as to track a rotational input motion of a user. At block 1330, in response to the rotational movement of the ring-shaped user-interface component, navigational operations are performed so that the user is able to navigate between the thermostat control options of the interactive menuing system. At block 1340, an inward pressing of the ring-shaped user-interface component by the user is detected via the switch. The inward pressing may correspond to a selection by the user of one of the thermostat control options. As described above, the inward pressing may be along a direction of an axis of rotation of the ring-shaped user-interface component and may be controlled by a motion guiding member that operationally couples the top member with the bottom member. The motion guiding member may contact the top member near its outer periphery to control the inward motion of the top member relative to the bottom member. At block 1350, an operation of the selected thermostat control option is performed in response to the detected inward pressing of the ring-shaped user-interface component.

In one embodiment, the operation performed may include: displaying a sub-menu including sub-options, setting or adjusting a parameter of the thermostat control, setting or adjusting a temperature level, setting or adjusting a time or date parameter, and the like. The inward pressing of the ring-shaped user-interface component may provide the user with tactile clicking feedback. The motion guiding member may be configured so that a substantially uniform tactile clicking feedback is provided regardless of where the user contacts and inwardly presses the ring-shaped user-interface component. In one embodiment, the thermostat is configured so that the rotational input motion and inward pressing of the ring-shaped user-interface component represent the sole physical user inputs.

The motion guiding member may include a plurality of stop members that extend from the bottom member and that are engageable with corresponding features of the top member to create a pivot point about which the top member pivots when the ring-shaped user-interface component and top member are inwardly pressed. In another embodiment, the motion guiding member includes a plurality of compliant mechanism coupled near the outer periphery of the top member. The compliant mechanisms are rigidly coupled with the top member and the bottom member and have a flexible middle portion.

Figure 14:
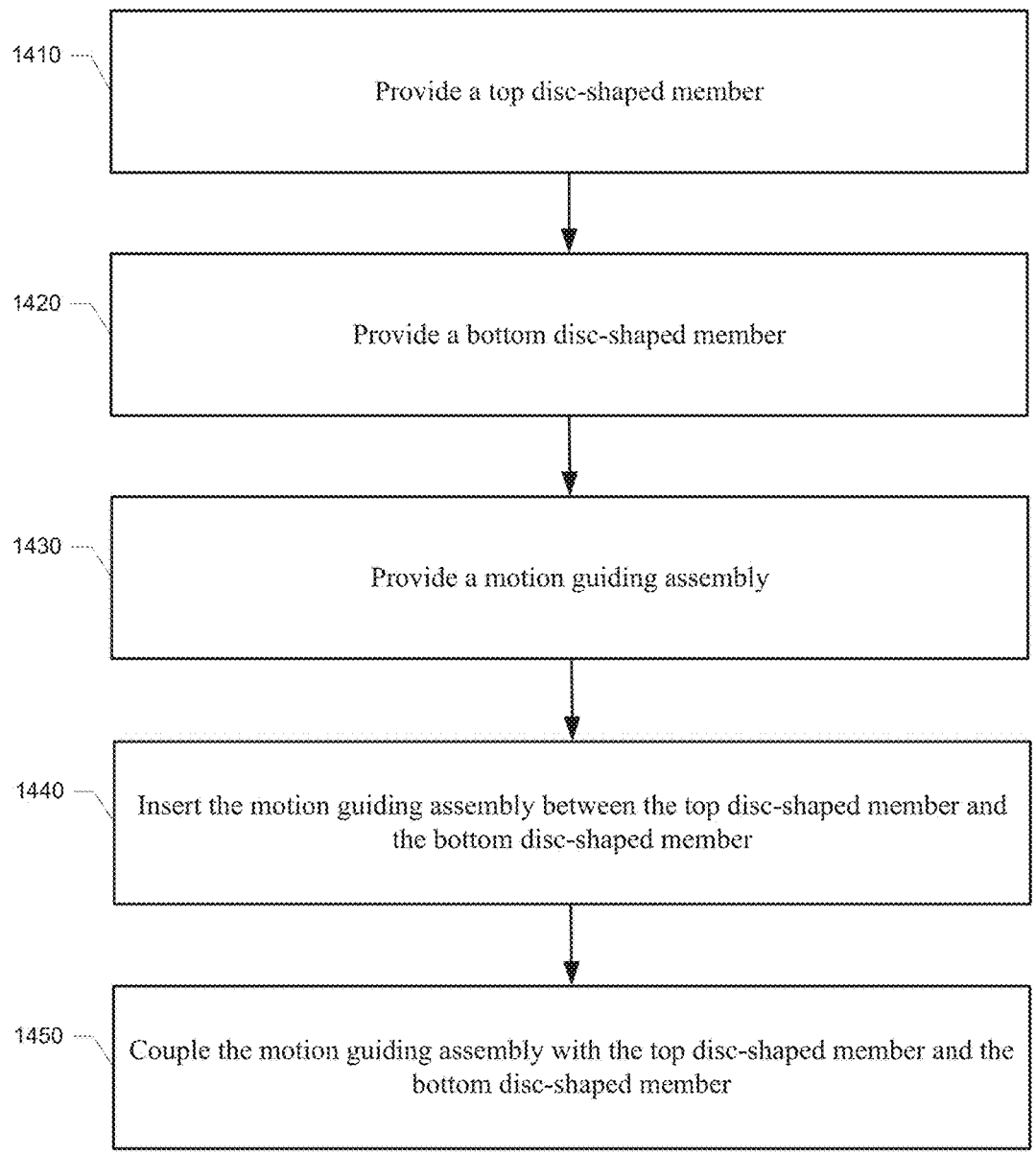
FIG. 14 illustrates a method of manufacturing a thermostat that includes a motion guiding assembly that improves tactile clicking sensation and/or sound.

FIG. 14 illustrates a method of manufacturing a thermostat that includes a motion guiding assembly that improves tactile clicking sensation and/or sound. At block 1410, a top disc-shaped member is provided, such as those described herein. At block 1420, a bottom disc-shaped member is provided, such as those described herein. At block 1430, a motion guiding assembly, such as those described in FIGS. 9A-12C is provided. At block 1440, the motion guiding assembly is inserted between the top disc-shaped member and the bottom disc-shaped member. At block 1450, the motion guiding assembly is coupled with the top disc-shaped member and the bottom disc-shaped member such as in a manner described herein so that the rotation movement of the top disc-shaped member is limited and reduced relative to the bottom disc-shaped member and/or so that the a more planar relative motion between the members is provided.

Numerous specific details are included herein to provide a thorough understanding of the various implementations of the present invention. Those of ordinary skill in the art will realize that these various implementations of the present invention are illustrative only and are not intended to be limiting in any way. Other implementations of the present invention will readily suggest themselves to such skilled persons having the benefit of this disclosure.

In addition, for clarity purposes, not all of the routine features of the implementations described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure.

What is claimed is:

1. A device for controlling an energy consuming system comprising:
    a bottom member;
    a switch;
    a top member; and
    a motion guiding member that operationally couples the top member with the bottom member such that the top member is inwardly pressable and pivotable relative to the bottom member to allow the device to receive input from a user by contacting the switch with a component of the top member or the bottom member;
    wherein the switch is positioned near a central axis of the top member and the motion guiding member comprises a plurality of stop members that engage with corresponding components of the bottom member near an outer periphery of the bottom member to enable the top member to pivot relative to the bottom member, wherein pivoting of the top member involves three contact points including (1) a pivot point defined by engagement of a first stop member and a first component of the bottom member, (2) an inwardly directed force applied to the top member by the user generally opposite the pivot point, and (3) a mechanical engagement of the switch and the component of the top member or the bottom member, said switch being leverably forced inward responsive to the pivoting of the top member.

2. The device of claim 1, wherein the switch is centrally disposed on the bottom member and wherein the component comprises a rod coupled with the top member, the rod being positioned over the switch such that inward pressing of the top member causes the rod to contact the switch.

3. The device of claim 1, further comprising a spring coupled with the plurality of stop members, the spring biasing the top and bottom members apart.

4. The device of claim 3, further comprising a plurality of posts, each post being slidably disposed through an aperture of the bottom member and coupled with the top member such that rotational movement of the top member relative to the bottom member is limited.

5. The device of claim 1, further comprising a ring-shaped component rotationally coupled with the top member, the ring-shaped component being configured to track a rotational input motion to allow the user to scroll between options of a menu system.

6. The device of claim 5, wherein contacting the switch with the component of the top member or the bottom member allows the user to select an option of the menu system.

7. A device for controlling an energy consuming system comprising:
    a bottom member;
    a switch;
    a top member; and
    a motion guiding member that operationally couples the top member with the bottom member such that the top member is inwardly pressable and pivotable relative to the bottom member to allow the device to receive input from a user by contacting the switch with a component of the top member or the bottom member;
    wherein the switch is positioned near a central axis of the top member and the motion guiding member comprises a plurality of stop members that engage with flanges of the top member near an outer periphery of the top bottom member to enable the top member to pivot relative to the bottom member, wherein pivoting of the top member involves three contact points including (1) a pivot point defined by engagement of a first stop member and a first flange of the top member, (2) an inwardly directed force applied to the top member by the user generally opposite the pivot point, and (3) a mechanical engagement of the switch and the component of the top member or the bottom member.

8. The device of claim 7, wherein the switch is centrally disposed on the bottom member and wherein the component comprises a rod coupled with the top member, the rod being positioned over the switch such that inward pressing of the top member causes the rod to contact the switch.

9. The device of claim 7, further comprising a spring disposed between the top member and the bottom member, the spring biasing the top and bottom members apart.

10. The device of claim 9, further comprising a plurality of posts, each post being slidably disposed through an aperture of the bottom member and coupled with the top member such that rotational movement of the top member relative to the bottom member is limited.

11. The device of claim 7, further comprising a ring-shaped component rotationally coupled with the top member, the ring-shaped component being configured to track a rotational input motion to allow the user to scroll between options of a menu system.

12. The device of claim 11, wherein contacting the switch with the component of the top member or the bottom member allows the user to select an option of the menu system.

* * * * *